US009046742B2

(12) United States Patent
Sanada et al.

(10) Patent No.: US 9,046,742 B2
(45) Date of Patent: Jun. 2, 2015

(54) CAMERA, CONTROL APPARATUS FOR CAM DRIVE MECHANISM AND CONTROL METHOD FOR CAM DRIVE MECHANISM

(71) Applicant: RICOH IMAGING COMPANY, LTD., Tokyo (JP)

(72) Inventors: Shinichiro Sanada, Saitama (JP); Masahiro Inazuka, Saitama (JP); Kosei Kosako, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/444,238

(22) Filed: Jul. 28, 2014

(65) Prior Publication Data

US 2015/0037023 A1 Feb. 5, 2015

(30) Foreign Application Priority Data

Jul. 30, 2013 (JP) ................................ 2013-157532
Sep. 27, 2013 (JP) ................................ 2013-201697

(51) Int. Cl.
*G03B 19/12* (2006.01)

(52) U.S. Cl.
CPC ...................................... *G03B 19/12* (2013.01)

(58) Field of Classification Search
USPC ........................................................ 396/358
See application file for complete search history.

(56) References Cited

U.S. PATENT DOCUMENTS

| | | | | |
|---|---|---|---|---|
| 5,361,110 A * | 11/1994 | Haraguchi | .................... | 396/402 |
| 5,432,574 A * | 7/1995 | Miyazawa et al. | ............ | 396/349 |
| 8,137,006 B2 | 3/2012 | Misawa | | |
| 8,282,292 B2 | 10/2012 | Ono | | |
| 2002/0067921 A1 * | 6/2002 | Kaihara | ........................ | 396/358 |
| 2004/0161230 A1 * | 8/2004 | Hosokawa et al. | ........... | 396/177 |
| 2006/0177213 A1 * | 8/2006 | Tsukatani | ..................... | 396/358 |

FOREIGN PATENT DOCUMENTS

| | | |
|---|---|---|
| JP | 05-069600 | 3/1993 |
| JP | 2545354 | 7/1996 |
| JP | 2006-126389 | 5/2006 |
| JP | 2010-266617 | 11/2010 |

* cited by examiner

*Primary Examiner* — Clayton E LaBalle
*Assistant Examiner* — Dennis Hancock
(74) *Attorney, Agent, or Firm* — Greenblum & Bernstein P.L.C.

(57) ABSTRACT

A camera having a mirror drive mechanism, for rotating a movable mirror, includes a slider supported on a side of the movable mirror to be linearly movable in a vertical direction corresponding to an up-and-down rotation of the movable mirror, the slider including a cam follower; an end-face cam member positioned above a mirror up-and-down pivot, about which the movable mirror pivots, to be rotatable about a vertical rotational shaft, a cam follower provided on the slider is in contact with the end-face cam member so that the end-face cam member changes a vertical position of the slider via an end-face cam and the cam follower by rotating; and an end-face cam driver.
A control apparatus for a cam drive mechanism and a method of controlling a cam drive mechanism are also provided.

10 Claims, 26 Drawing Sheets

CAMERA, CONTROL APPARATUS FOR CAM DRIVE MECHANISM AND CONTROL METHOD FOR CAM DRIVE MECHANISM

BACKGROUND OF THE INVENTION

1. Field of the Invention

The present invention relates to a camera having a movable mirror for leading light emanated from an object to a viewfinder optical system, and in particular relates to a movable mirror drive mechanism and the structure of the peripheral part thereof in a camera. The present invention also relates to a control apparatus for a cam drive mechanism and a control method therefor.

2. Description of the Related Art

Inside SLR cameras, a movable mirror (quick-return mirror) is provided, which is capable of moving up and down; more specifically, capable of rotating between a mirror-down position (a position advanced into an optical path), in which the movable mirror is positioned in an optical path of an imaging optical system to reflect incident light emanated from an object (object-emanated light) toward a viewfinder optical system, and a mirror-up position (a position retracted from an optical path), in which the movable mirror is retracted from the optical path of the imaging optical system to allow the object-emanated light to travel toward a shutter. The shutter is provided behind the movable mirror and controls exposure on a photographic light-receiving medium such as an image sensor or silver-salt film, etc.

If the camera is structured such that the mirror drive mechanism for driving the movable mirror, and the shutter control mechanism for controlling the travel of shutter curtains (blades) and the charging operation of the shutter are separately arranged on the laterally opposite sides of the mirror box that accommodates the movable mirror, miniaturization of the camera in the lateral (widthwise) direction thereof is limited. By contrast, in the camera disclosed in Japanese Unexamined Patent Publication No. 2006-126389, the mirror drive mechanism and the shutter control mechanism are integrally arranged on one of the laterally opposite sides of the mirror box.

In addition, a drive mechanism which makes a cam member rotate using a motor and controls the operation of a driven object via a cam surface formed on the cam member has been widely used. For instance, in SLR cameras which incorporate a quick-return mirror, operations of the drive mechanism therefor are controlled such that the cam member is rotated by the driving force of the motor, which is a drive source of the drive mechanism, that a member having a cam follower (hereinafter referred to as the "driven member") is moved via a cam surface of the cam member, and that the mirror-up operation, the mirror-down operation of the mirror drive mechanism and the shutter charging operation of the shutter charge mechanism are performed at predetermined timings.

The following cam members are known in the art as the type of cam member described above: an end-face cam rotatable about an axis of rotation which includes a cam surface formed at an end surface thereof in the direction along the axis of rotation, and a peripheral cam rotatable about an axis of rotation which includes a cam surface formed on a peripheral surface thereof surrounding the axis of rotation. In either of these cam members, the cam surface includes the following two cam areas: a cam area which presses the cam follower of the driven member in accordance with rotation of the cam member (specifically, an inclined cam area, the amount of projection thereof along the direction of the rotation axis increases in the direction of rotation of the cam member in the case of the end-face cam, or an inclined cam area the amount of projection of which away from the rotation axis increases in the direction of rotation of the cam member in the case of the peripheral cam), and a cam area which runs in the direction opposite to the direction in which the aforementioned cam area presses the cam follower as proceeding in the direction of rotation (specifically, an inclined cam area, the amount of projection thereof toward the axis of rotation decreases in the direction of rotation in the case of the end-face cam, or an inclined cam area which approaches the axis of rotation in the direction of rotation in the case of the peripheral cam). The former cam area and the latter cam area will be hereinafter referred to as the pressing cam area and the recessed cam area, respectively.

The cam follower is pressed under load conditions in the pressing cam area, whereas the direction of action of the load on the cam surface is reversed upon the area of the cam surface, against which the cam follower abuts, being switched from the pressing cam area to the recessed cam area. Variations of this load on the cam surface cause a difference in speed of rotation of the cam member during rotation thereof, so that there is a possibility of the rotational speed of the cam member with the recessed cam area in use becoming greater than assumed. Specifically, in the case where the driven member is biased in a direction to bring the cam follower into contact with the cam surface, the biasing force acts as an assisting torque in a direction to press the recessed cam area against the cam follower to promote (assist) rotation of the cam member, which enhances the tendency to increase the rotational speed of the cam member. Additionally, if the cam member rotates at high speed, the operating speed of the driven system including the driven member becomes greater than that in the case of using an assumed cam curve, so that there is a possibility of shock which acts on the driven system becoming great. For instance, in the mirror drive mechanism for SLR cameras, bouncing of the movable mirror upon completion of the mirror-up operation or the mirror-down operation becomes great, which limits an increase in photographing frame speed. Additionally, in the case where the rotational speed of the cam member is great and the angle of inclination of the recessed cam area of the cam surface (the amount of displacement given to the cam follower per unit of rotation angle of the cam member) is great, there is a possibility of the cam follower becoming incapable of following the cam surface and thus being instantaneously disengaged from the cam surface.

As countermeasures for the prevention of such malfunctions in the operation of the mirror drive mechanism in the recessed cam area, it is conceivable to reduce the inclination of the recessed cam area. However, if the inclination of the recessed cam area is reduced, problems with the cam member becoming great in size and with the cam curve deviating from an ideal cam curve arise. As another countermeasure for the preventing malfunctions, controlling the operation of the motor to apply a brake on the cam member to halt the cam member by driving the motor in the reverse direction or making the motor stop driving at a timing when no loads are imposed on the cam member and are known in the art (disclosed in Japanese Unexamined Patent Publication H05-69600).

In the case where the mirror drive mechanism and the shutter control mechanism are installed together on one of the laterally opposite sides of the mirror box, there is a problem with the space for installation of these mechanisms being limited due to mutual interference of the components thereof. Specifically, in the case where a motor for driving the movable mirror and a motor for charging the shutter are provided independently like the camera disclosed in Japanese Unexamined Patent Publication No. 2006-126389, it is difficult arrange the components in a limited space; for instance, instead of preventing the camera from increasing in size in the lateral (widthwise) direction, there has been a possibility of the camera increasing in size in the vertical direction (height direction) or the forward/rearward direction (optical axis direction). Accordingly, an objective of the present invention is to provide a camera capable of being made compact in size while having superior space utilization in the internal structure thereof.

In addition, if a brake is applied to the cam member via control of a motor upon the area of the cam surface in use (in operation) being switched from the pressing cam area to the recessed cam area, the rotational speed of the cam member becomes excessively small, which causes the operation of the driven system to delay with respect to an assumed timing. For instance, in the case where this motor control method is applied to the mirror drive mechanism for SLR cameras, the mirror-up operation and the mirror-down operation deteriorates in operating speed, which downgrades the performance in photographing frame speed. Accordingly, another objective of the present invention is to provide a control apparatus and a control method, for use to control a cam drive mechanism, each of which suppresses variations in the speed of the cam member due to load variations on the cam member and is superior in operating performance.

The first aspect of the present invention relates to a camera, including a movable mirror which is pivoted about a mirror up-and-down pivot orthogonal to an optical axis of an imaging optical system of the camera to be rotatable between an advanced position, in which the movable mirror is positioned in an optical path of the imaging optical system and is inclined at an angle to reflect incident light emanated from an object toward a viewfinder optical system of the camera, and a retracted position, in which the movable mirror is retracted upward from the optical path to allow the object-emanated light to travel toward a shutter which is installed in a rearward position with respect to the optical path; and a mirror drive mechanism for rotating the movable mirror. The mirror drive mechanism includes a slider which is supported on a side of the movable mirror to be linearly movable in a vertical direction that corresponds to an up-and-down rotation of the movable mirror, which rotates the movable mirror to the retracted position and the advanced position by moving upward and downward, respectively, the slider including a cam follower; an end-face cam member which is positioned above the mirror up-and-down pivot with respect to the vertical direction to be rotatable about a rotational shaft extending in the vertical direction, wherein the end-face cam member includes an end-face cam with which the cam follower is in contact, and the end-face cam member changes a position of the slider in the vertical direction via the end-face cam and the cam follower by rotating; and an end-face cam driver which rotates the end-face cam member.

"Upward/downward direction (vertical direction)" in the specification of the present invention denotes the direction of displacement of a predetermined point on the movable mirror (i.e., a direction substantially orthogonal to the mirror up-and-down pivot) when the movable mirror is rotated about the mirror up-and-down pivot as viewed from the front of the movable mirror (along the optical axis of the imaging optical system).

It is desirable for the end-face cam driver to include a mirror drive motor having a rotational output shaft, and a mirror-drive gear train which transmits a driving force of the rotational output shaft to the end-face cam member. The mirror drive motor is provided at a position away from the slider, in a camera widthwise direction along the mirror up-and-down pivot, with the rotational output shaft extending upward. The mirror-drive gear train includes a plurality of gears, each of which is rotatably supported by a rotational shaft extending in the vertical direction, the mirror-drive gear train being arranged in a space, defined in the camera widthwise direction, between the mirror drive motor and the slider.

It is desirable for the camera to include a shutter drive mechanism which is installed in the above-mentioned space.

It is advisable for the shutter charge mechanism, which is for making the shutter drive mechanism perform a shutter charge operation, to be configured of the following components. Namely, a charge lever which is pivoted about a charge-lever pivot which is parallel to the mirror up-and-down pivot and makes the shutter drive mechanism perform the shutter charge operation by swinging about the charge-lever pivot; a peripheral-cam-integrated member which is rotatably supported by a rotational shaft parallel to the mirror up-and-down pivot and makes the shutter charge lever swing in accordance with rotation of the peripheral-cam-integrated member; a shutter charge motor having a rotational output shaft parallel to the mirror up-and-down pivot; and a shutter-charge gear train which is configured of a plurality of gears, each rotatable about a rotational shaft parallel to the mirror up-and-down pivot and transmits a driving force of the rotational output shaft of the shutter charge motor to the peripheral-cam-integrated member. The shutter charge lever, the peripheral-cam-integrated member and the shutter-charge gear train are supported below the slider, and the shutter charge motor is supported below the shutter drive mechanism.

In addition, if the shutter charge lever, the peripheral-cam-integrated member and the shutter-charge gear train are configured to be supported below the slider and if the shutter charge motor is configured to be supported below the shutter drive mechanism, the arrangement of these components becomes superior, particularly in regard to space utilization.

It is desirable for the mirror drive mechanism, the shutter drive mechanism and the shutter charge mechanism to be arranged between a mirror box, which supports the movable mirror therein, and a battery chamber which accommodates a battery.

It is desirable for a camera body of the camera to include a front bulging portion which bulges forward from a front side of the battery chamber; a finger hooking recess which is formed between the front bulging portion and the mirror box; and a hand-held grip, a contour of which includes contours of the front bulging portion and the finger hooking recess, wherein the mirror drive motor is positioned behind the finger hooking recess.

It is desirable for the camera to further include an information display which is provided on top of the camera at an inclined position so that a front side of the information display is positioned higher than a rear side of the information display, with respect to a forward/rearward direction parallel to the optical axis. The mirror-drive gear train and the end-face cam member are at least partly arranged in a space formed below the front of the information display.

As an example of the specific structure of the slider, the slider can include a first slider which includes a first contact portion which contacts a pressed portion of the movable mirror holding member from below, wherein the first slider presses the pressed portion at the first contact portion to thereby rotate the movable mirror to the retracted position when moving upward; a second slider, which is movable relative to the first slider in the vertical direction, which includes a second contact portion which contacts the pressed portion of the movable mirror holding member from above, and wherein the second slider presses the pressed portion at the second contact portion to thereby rotate the movable mirror to the advanced position when moving downward; and a resilient connecting member which biases the first slider relative to the second slider in a direction to reduce a distance between the first contact portion and the second contact portion.

In this case, it is desirable for the cam follower to be provided on the first slider, wherein the camera further includes a slider biaser which biases the first slider upward to make the cam follower come into contact with the end-face cam. The resilient connecting member biases the second slider downward toward the first slider with a biasing force greater in biasing force than the slider biaser.

It is desirable for the first slider and the second slider to include a clearance limit portion which limits a minimum clearance in the vertical direction between the first contact portion and the second contact portion. A size of the minimum clearance, which is defined by the clearance limit portion, is determined to allow the pressed portion of the movable-mirror holding member to be held between the first contact portion and the second contact portion with a predetermined clearance therebetween.

The second aspect of the present invention relates to a control apparatus and a control method for a cam drive mechanism.

In an embodiment, a control apparatus for a cam drive mechanism is provided, including a motor; a driven member having a cam follower; a rotatable cam member which rotates by a driving force of the motor; a cam surface which is formed on the rotatable cam member, the cam surface including a pressing cam area which is inclined so as to press the cam follower against a load when the rotatable cam member is rotated by rotation of the motor in a single direction, and a recessed cam area which is inclined in an inclination direction opposite to an inclination direction of the pressing cam area; and a motor controller which rotates the rotatable cam member by the rotation of the motor in the single direction. The motor controller changes a rotational speed of the motor between a time when the rotatable cam member is positioned at a first rotational position thereof at which the recessed cam area and the cam follower are faced against each other, and a time when the rotatable cam member is positioned at a second rotational position thereof at which the pressing cam area and the cam follower are faced against each other.

In an embodiment, a method is provided for controlling a cam drive mechanism, including a motor, a driven member having a cam follower, a rotatable cam member which rotates by a driving force of the motor, and a cam surface which is formed on the rotatable cam member and includes a pressing cam area which is inclined so as to press the cam follower against a load when the rotatable cam member is rotated by rotation of the motor in a single direction, and a recessed cam area which is inclined in an inclination direction opposite to an inclination direction of the pressing cam area, wherein the method includes rotating the motor in the single direction at a predetermined speed when the rotatable cam member is positioned at a first rotational position thereof at which the pressing cam area and the cam follower are faced against each other, and rotating the motor in the single direction at a speed that is different from the predetermined speed when the rotatable cam member is positioned at a second rotational position thereof at which the recessed cam area and the cam follower are faced against each other.

In either of the control method or apparatus, when the rotatable cam member is positioned at the first rotational position, it is desirable for the motor controller to control an operation of the motor so that the motor rotates the rotatable cam member at a speed that is slower than that when the rotatable cam member is positioned at the second rotational position.

The rotational speed of the motor can be changed by changing the duty ratio of a pulse waveform for driving the motor or by changing the motor drive voltage.

It is desirable for the motor controller to change the duty ratio by making an energizing period and a non-energizing period of the motor in a cycle period different in duration from each other. Alternatively, it is desirable for the motor controller to change the duty ratio by setting a duration of a short-circuit in a cycle period between terminals of the motor.

The duty ratio when the rotatable cam member is positioned at the first rotational position, at which the recessed cam area and the cam follower are faced against each other, is preferably smaller than 50 percent.

The second aspect of the present invention is effective especially in a configuration in which the biasing force in a direction to bring the cam follower into contact with the cam surface acts on the driven member.

It is desirable for the control apparatus to include a biaser which exerts a biasing force on the driven member in a direction to bring the cam follower into contact with the cam surface, wherein the load acts on a rotation of the rotatable cam member due to the biasing force on the driven member when the pressing cam area of the cam surface presses the cam follower, and a torque in a direction to assist rotation of the rotatable cam member acts on the rotatable cam member due to the biasing force on the driven member when the cam follower comes into contact with the recessed cam area of the cam surface.

Namely, variations of the load on the rotatable cam member become great due to the biasing force on the driven member; however, variations in rotational speed of the rotatable cam member can be suppressed by control of the rotational speed of the motor according to the present invention.

It is desirable for the control apparatus to include a code plate mounted on the rotatable cam member, and a contact brush having a terminal which selectively contacts lands on the code plate. The motor controller detects a rotational position of the rotatable cam member from changes in relative contact position between the contact brush and the lands to control the rotational speed of the motor.

According to the first aspect of the present invention, an internal structure including the drive mechanism for the movable mirror is efficiently arranged in a space alongside one side of the movable mirror, which makes it possible to achieve a compact camera even though it is configured of a relatively large number of components.

According to the control apparatus and the control method for the cam drive mechanism of the second aspect of the present invention, by varying the rotational speed of the motor in accordance with load variations on the rotatable cam member, variations in the speed of the rotatable cam member due to the load variations can be suppressed, which makes it possible to drive the rotatable cam member according to an assumed cam curve. Specifically, by driving the motor at a reduced speed, rather than driving the motor in the reverse direction or making the motor stop driving, in a state where the recessed cam area and the cam follower face each other, the rotatable cam member can be prevented from being accelerated, and the rotational speed of the rotatable cam member can be prevented from being excessively reduced, which makes it possible to give excellent operating performance to the cam drive mechanism.

The present disclosure relates to subject matter contained in Japanese Patent Application Nos. 2013-157532 (filed on Jul. 30, 2013) and 2013-201697 (filed on Sep. 27, 2013) which are expressly incorporated herein by reference in their entireties.

BRIEF DESCRIPTION OF THE DRAWINGS

The present invention will be described below in detail with reference to the accompanying drawings in which.

DESCRIPTION OF THE EMBODIMENTS

Figure 1:
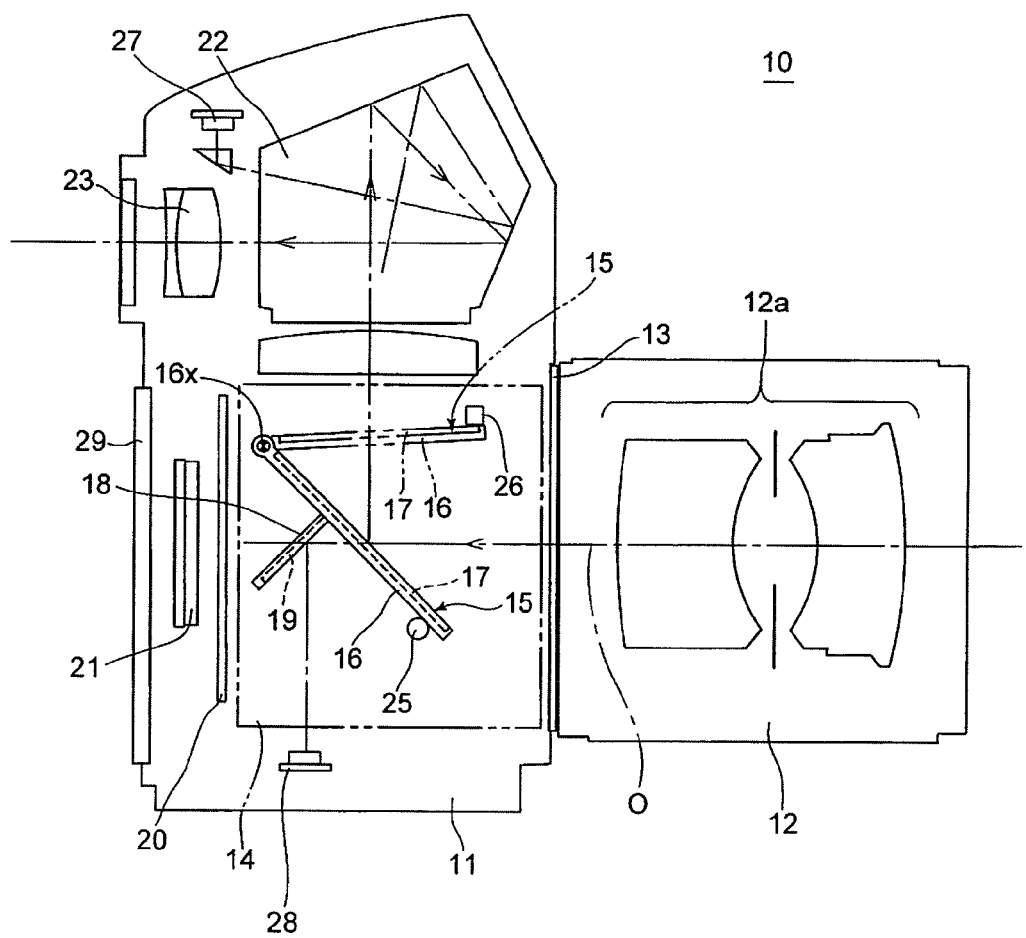
FIG. 1 is a diagram showing a schematic representation of the optical system of an SLR camera according to the present invention.

The present invention will be described below with reference to two SLR camera embodiments. FIG. 1 shows an SLR camera (hereinafter referred simply to as camera) 10 which is provided with an optical system which is common in the two embodiments of the SLR cameras. The camera 10 is provided on the front of a camera body 11 with a lens mount 13, to which an interchangeable lens 12 is detachably attached. The camera 10 is provided, in the camera body 11 behind the lens mount 13, with a mirror box 14. The camera body 11 is provided inside the mirror box 14 with a movable mirror (quick-return mirror) 15. The movable mirror 15 is provided with a main mirror 17 and a sub-mirror 19. The movable mirror 15 is constructed so that the main mirror 17 and the sub-mirror 19 are fixedly supported on a main-mirror holding frame (movable-mirror holding member/mirror seat) 16 and a sub-mirror holding frame 18, respectively, and that the sub-mirror holding frame 18 is positioned behind the main-mirror holding frame 16 and rotatably supported thereby. The main-mirror holding frame 16 is supported by the mirror box 14 to be rotatable relative to the mirror box 14 about a pair of main mirror support shafts (mirror up-and-down pivots) 16x. The pair of main mirror support shafts 16x can be formed to project from either both lateral sides of the main-mirror holding frame 16 (in this case, a pair of bearing holes which respectively support the pair of main mirror support shafts 16x are formed in the mirror box 14) or both lateral sides of the mirror box 14 (in this case, a pair of bearing holes which respectively support the pair of main mirror support shafts 16x are formed in the main-mirror holding frame 16).

The camera 10 is provided with a focal plane shutter (hereinafter referred simply to as shutter) 20 behind the movable mirror 15, and is provided with an image sensor (photographic light-receiving medium) 21 behind the shutter 20. The shutter 20 is configured of a leading curtain and a trailing curtain, and object-emanated light is allowed to pass through the shutter 20 to travel toward the image sensor 21 by making the leading curtain and the trailing curtain travel with a predetermined time difference therebetween by a shutter drive unit (shutter drive mechanism) 35 (see FIGS. 2, 4 and 5). The camera 10 shown in FIG. 1 is a digital camera using the image sensor 21 as a photographic light-receiving medium; however, the present invention can also be applied to a camera using silver-salt film as a photographic light-receiving medium.

Figure 2:
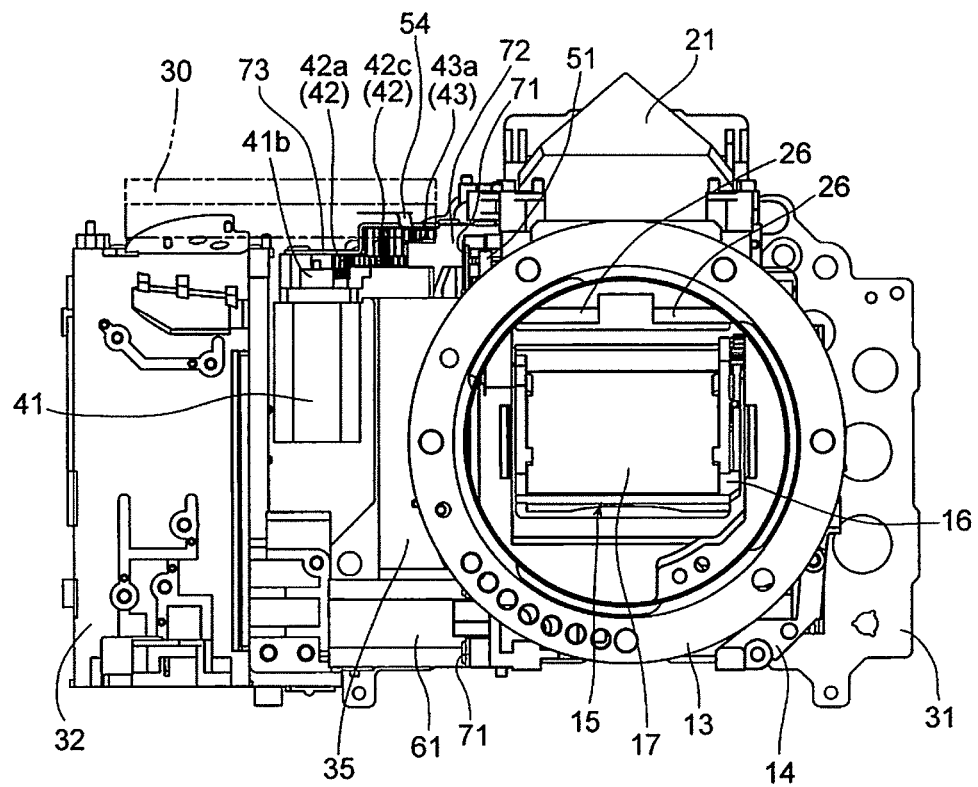
FIG. 2 is a front elevational view of a first embodiment of the SLR camera, showing an internal structure thereof.
Figure 8:
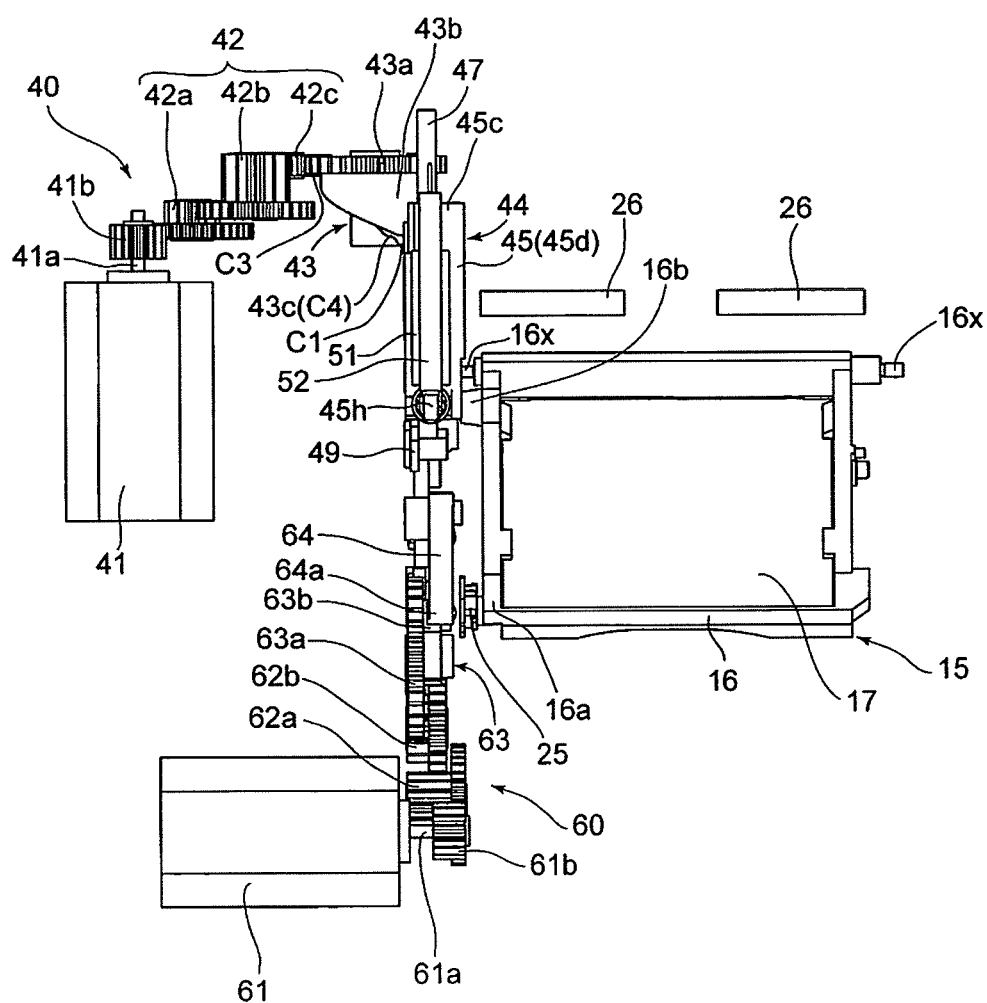
FIG. 8 is a front elevational view of the mirror drive mechanism and the shutter charge mechanism of the first embodiment of the SLR camera.
Figure 9:
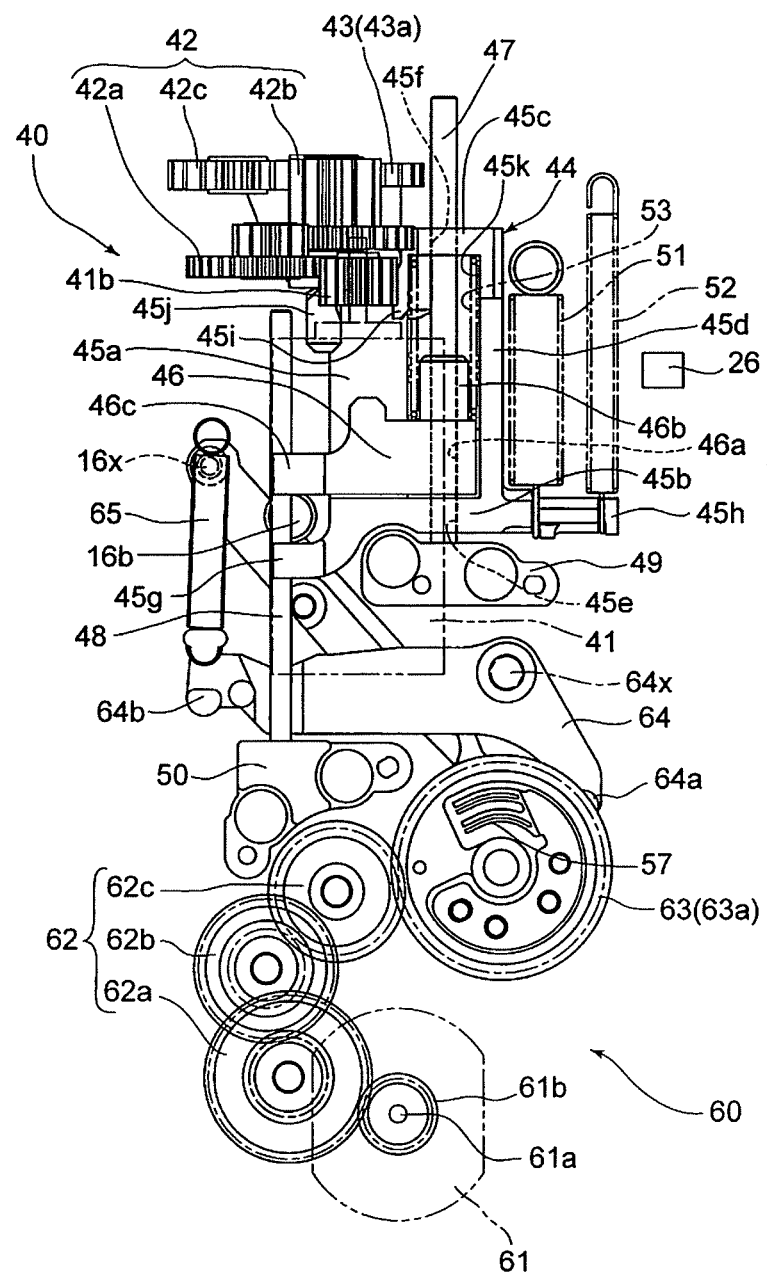
FIG. 9 is a side elevational view of the mirror drive mechanism and the shutter charge mechanism of the first embodiment of the SLR camera.
Figure 17:
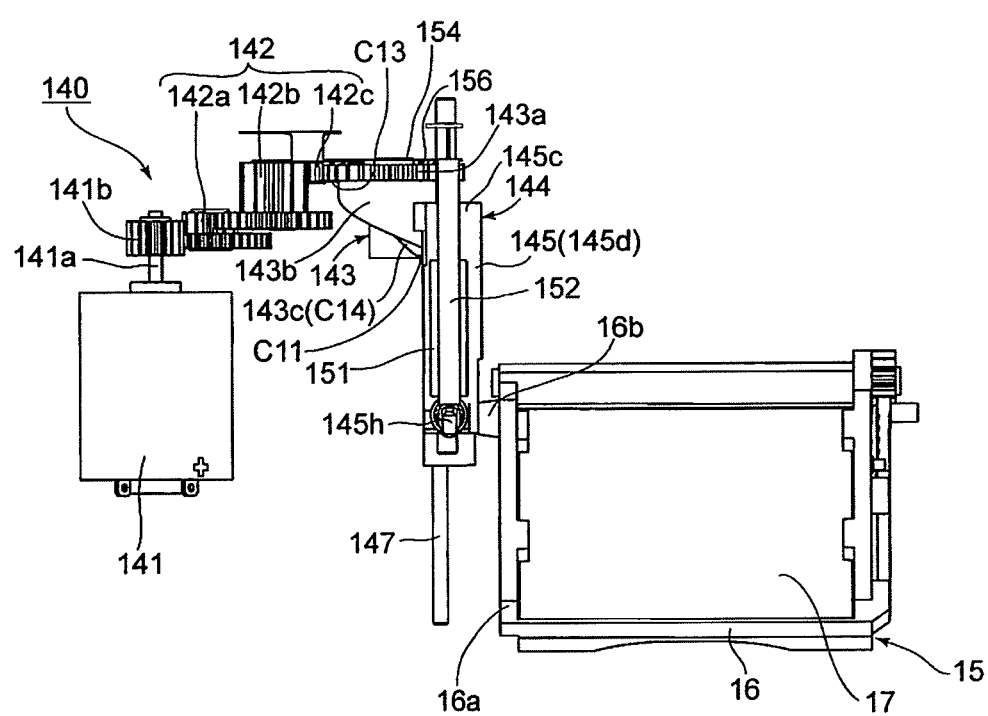
FIG. 17 is a front elevational view of the mirror drive mechanism of the second embodiment of the SLR camera in the mirror-down state.

In the following description, in a state where the interchangeable lens 12 is mounted onto the lens mount 13, the direction along an optical axis O of the imaging optical system ranging from a photographing lens system 12a provided inside the interchangeable lens 12 to the image sensor 21 is defined as the forward/rearward direction, wherein the object side and the image sensor 21 side in the forward/rearward direction are defined as the front side and the rear side, respectively. In addition, the pair of main mirror support shafts 16x extend coaxially in a direction orthogonal to the optical axis O, and the direction of this extension of the pair of main mirror support shafts 16x is defined as the leftward/rightward direction (widthwise direction) of the camera 10. Additionally, the direction of variation (moving path) of a predetermined point on the movable mirror 15 is defined as the upward/downward direction (vertical direction), in a front elevational view of the camera 10 as shown in FIGS. 2, 8 and 17. Accordingly, an axis extending in the forward/rearward direction, an axis extending in the leftward/rightward direction and an axis extending in the upward/downward direction have a positional relationship such that these three axes are mutually perpendicular.

Figure 21:
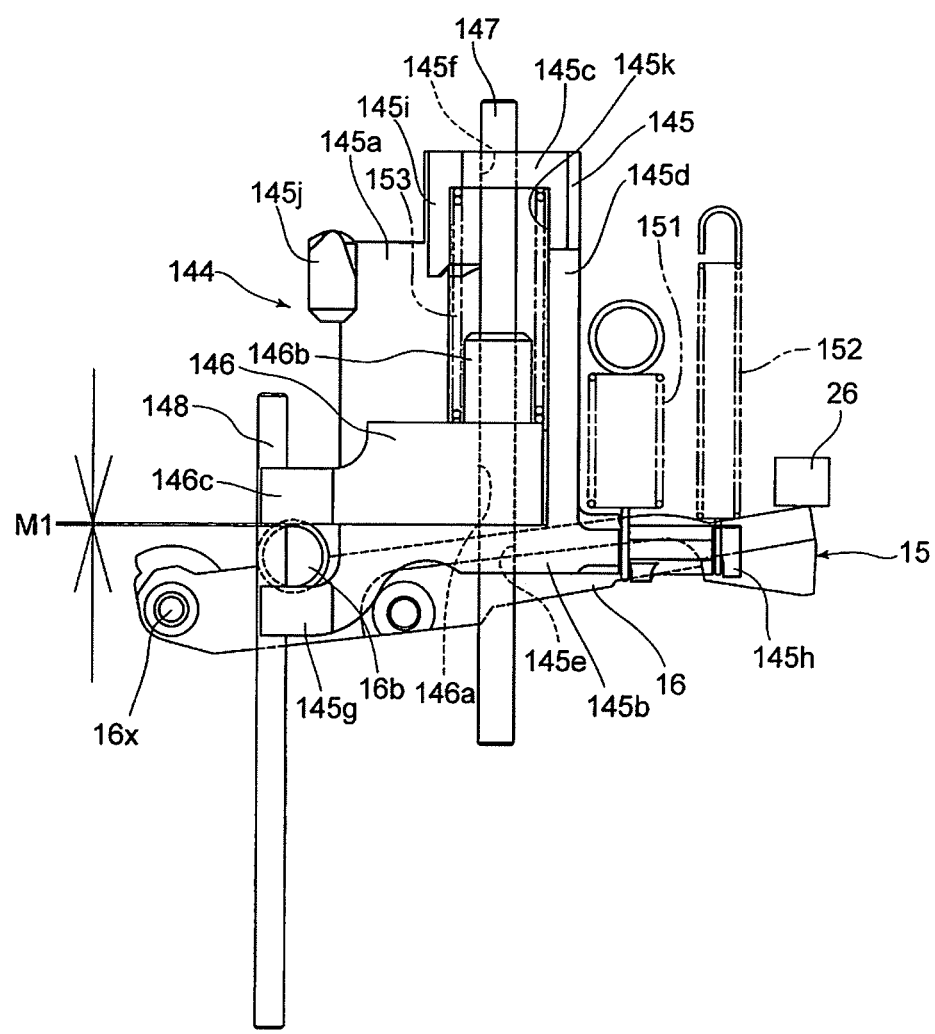
FIG. 21 is a side elevational view of the portion of the mirror drive mechanism of the second embodiment of the SLR camera in the mirror-up state.

The movable mirror 15 reciprocatively rotates (swings) about the pair of mirror support shafts 16x between a mirror-down position (advanced position; shown by solid lines in FIG. 1 and also shown in FIGS. 2, 5 through 12, and 16 through 20), in which the movable mirror 15 is positioned in a photographing optical path in front of the shutter 20 to be inclined at an angle of approximately 45 degrees with respect to the optical axis O, and a mirror-up position (retracted position; shown by two-dot chain lines in FIG. 1 and also shown in FIGS. 13 and 21), in which the movable mirror 15 is retracted upward from the aforementioned photographing optical path. Although the upward/downward direction of the camera 10 has been defined above, the directions of the movable mirror 15 toward the mirror-up position and the mirror-down position correspond to the upward direction and the downward direction in the upward/downward direction of the camera 10, respectively. As shown in FIGS. 1, 8, 11, 12, 19 and 20, a mirror-down position defining protrusion 25 projects inside the mirror box 14 from an inner surface of one of the laterally-opposed side walls (the left side wall as viewed from front) of the mirror box 14 that are positioned on both lateral sides of the movable mirror 15, and the mirror-down position of the movable mirror 15 is defined by engagement of the mirror-down position defining protrusion 25 with a stopper 16a which constitutes a portion of a side of the main-mirror holding frame 16. The installation position of the mirror-down position defining protrusion 25 to the mirror box 14 can be finely adjusted. In addition, a mirror-up shock-absorbing member 26 is fixedly installed inside the mirror box 14. An upper surface of the main-mirror holding frame 16 comes into contact with the mirror-up shock-absorbing member 26 when the movable mirror 15 rotates to the mirror-up position.

The camera 10 is provided therein, above the movable mirror 15, with a pentagonal prism 22, and is provided behind the exit surface of the pentagonal prism 22 with an eyepiece lens 23. The pentagonal prism 22 and the eyepiece lens 23 constitute a viewfinder optical system. Object-emanated light which enters the mirror box 14 through the photographing lens system 12a in the interchangeable lens 12, with the interchangeable lens 12 mounted to the lens mount 13, is reflected upward by the main mirror 17 to be incident on the pentagonal prism 22 and reflected therein and observable through the eyepiece lens 23 when the movable mirror 15 is in the mirror-down position. In this state (mirror-down state), a photometering operation using a photometering unit 27 which is installed behind the pentagonal prism 22 can be carried out. In addition, when the movable mirror 15 is in the mirror-down position, the sub-mirror holding frame 18 projects obliquely downwards from the underside of the main mirror 17 so that part of the object-emanated light is reflected downward by the sub-mirror 19 to be incident on a distance measuring unit 28 provided below the mirror box 14, which makes it possible to detect an object distance.

Figure 4:
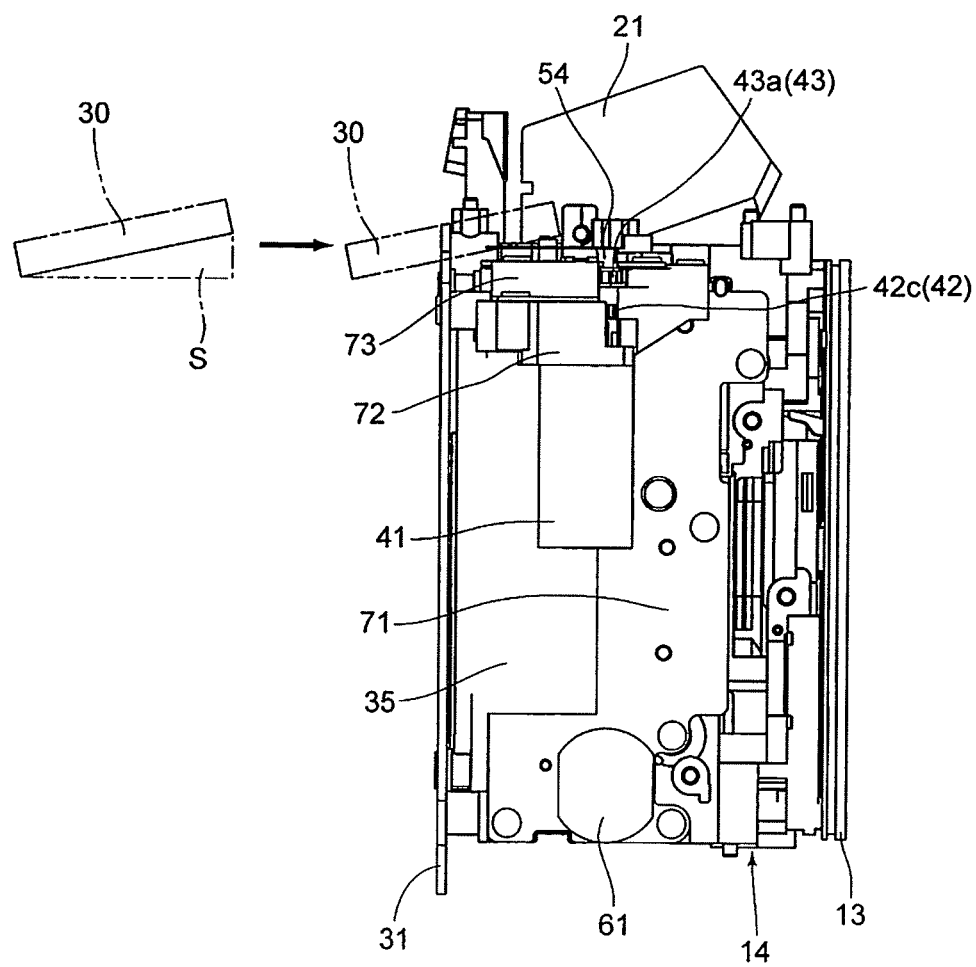
FIG. 4 is a side elevational view of the first embodiment of the SLR camera, showing an internal structure thereof with a battery chamber removed.

On the other hand, when the movable mirror 15 is in the mirror-up position, the object-emanated light which enters the mirror box 14 through the photographing lens system 12a travels toward the shutter 20 without being reflected by the main mirror 17, thus being capable of being made incident on the light receiving surface of the image sensor 21 by opening the shutter 20. When the movable mirror 15 is in the mirror-up position, the sub-mirror 18 is retracted to the underside of the main-mirror holding frame 16. Electronic object images obtained via the image sensor 21 and various other information can be displayed on an LCD monitor 29 provided on the back of the camera body 11. In addition, as shown in FIGS. 2 and 4, the camera body 11 is provided with a sub-LCD (information display) 30 for use as an information display on an outer surface of the camera body 11, specifically on a top surface thereof which is positioned on one side (the left side with respect to FIG. 2) of the portion of the camera body 11 which accommodates the pentagonal prism 22. To enhance viewability of the sub-LCD 30, the sub-LCD 30 is mounted on top of the camera body 11 at an incline so that the front of the sub-LCD 30 is positioned higher than the rear thereof in the forward/rearward direction.

Figure 3:
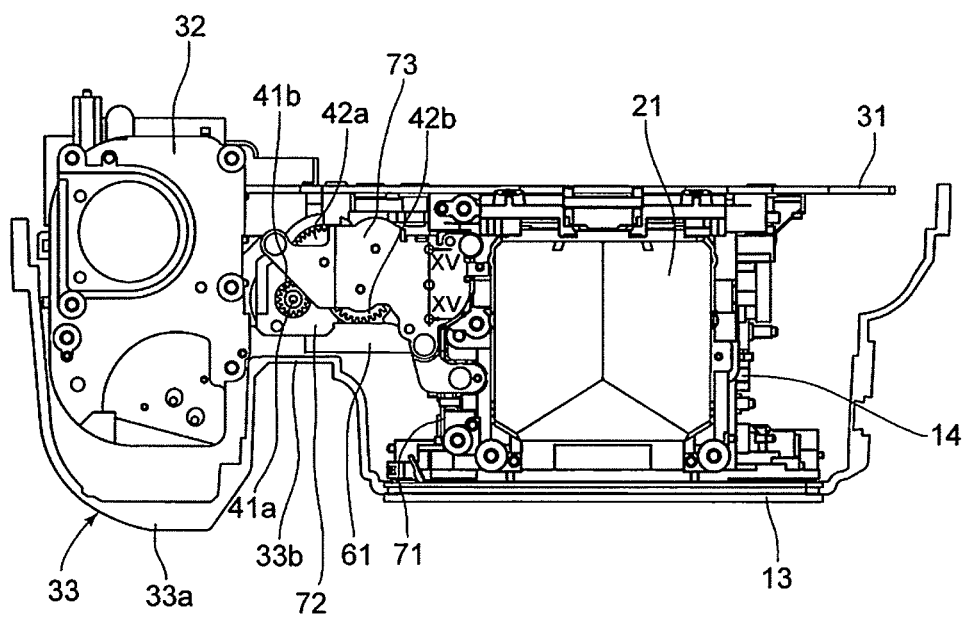
FIG. 3 is a top view of the first embodiment of the SLR camera, showing an internal structure thereof.
Figure 5:
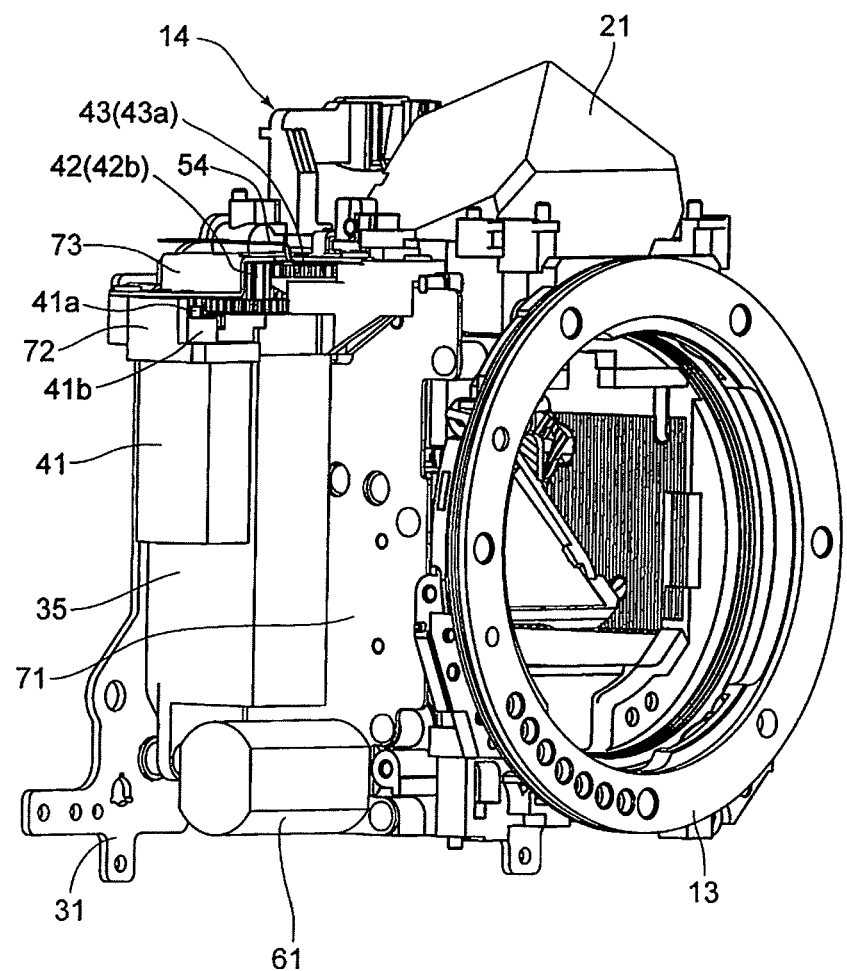
FIG. 5 is a perspective view of the first embodiment of the SLR camera, showing an internal structure thereof with the battery chamber removed.

The internal structure of the first embodiment of the camera 10 will be hereinafter discussed with reference to FIGS. 2 through 15. The mirror box 14 is provided with a pair of laterally-opposed side walls that are spaced from each other in the leftward/rightward direction, and the camera body 11 is provided immediately behind the mirror box 14 with a rear fixed plate 31 which is fixed to the back of the mirror box 14. As shown in FIGS. 2 and 3, the camera body 11 is provided on one side (the left side as viewed from front) of the mirror box 14 with a battery chamber 32 which is laterally spaced apart from the mirror box 14. FIGS. 4 and 5 each show an internal structure of the camera 10 with the battery chamber 32 removed. The fronts of the mirror box 14 and the battery chamber 32 are covered with a front cover 33 (shown only in FIG. 3). The front cover 33 is provided with a front bulging portion 33a which bulges forward to cover the front of the battery chamber 32 and a finger hooking recess 33b adjacent to the front bulging portion 33a. The front bulging portion 33a and the finger hooking recess 33b form the basic contour of a hand-held grip of the camera 10 that is gripped when the camera 10 is held by hand.

The camera body 11 is provided with a mirror drive mechanism 40, a shutter drive unit 35 and a shutter charge mechanism 60 in the space between the mirror box 14 and the battery chamber 32. The mirror drive mechanism 40 makes the movable mirror 15 reciprocatively rotate up and down, the shutter drive unit 35 latches the shutter 20 and unlatches the shutter 20 to allow the shutter 20 to travel, and the shutter charge mechanism 60 makes the shutter 20 perform a shutter charge operation.

The mirror drive mechanism 40 is installed alongside one side (the left side as viewed from front) of the mirror box 14.

The mirror drive mechanism 40 is provided with a mirror drive motor (an element of an end-face cam driver) 41, a reduction gear train (an element of the end-face cam driver/mirror-drive gear train) 42 which transmits a rotational driving force of a rotary output shaft 41a of the mirror drive motor 41, an end-face cam gear (end-face cam member) 43 to which the rotational driving force is transmitted via the reduction gear train 42, and a slider 44, the position of which is controlled by the end-face cam gear 43. As viewed from the front, as shown in FIGS. 2 and 8, the mirror drive motor 41 is positioned alongside an upper half of the battery chamber 32 so that the rotational output shaft 41a extends in the upward/downward direction, the slider 44 is positioned alongside an upper half of the mirror box 14, and the reduction gear train 42 and the end-face cam gear 43 are positioned above the mirror drive motor 41 and the slider 44, which are arranged spaced apart from each other in the leftward/rightward direction. The mirror drive mechanism 40 is arranged in an upper half of the space between the mirror box 14 and the battery chamber 32, and the reduction gear train 42 and the end-face cam gear 43, in particular, are positioned above the pair of main mirror support shafts 16x in the upward/downward direction. In addition, in the forward/rearward direction, substantially the entire part of the mirror drive motor 41 and a portion of the reduction gear train 42 are positioned behind the finger hooking recess 33b, as shown in FIG. 3.

Figure 10:
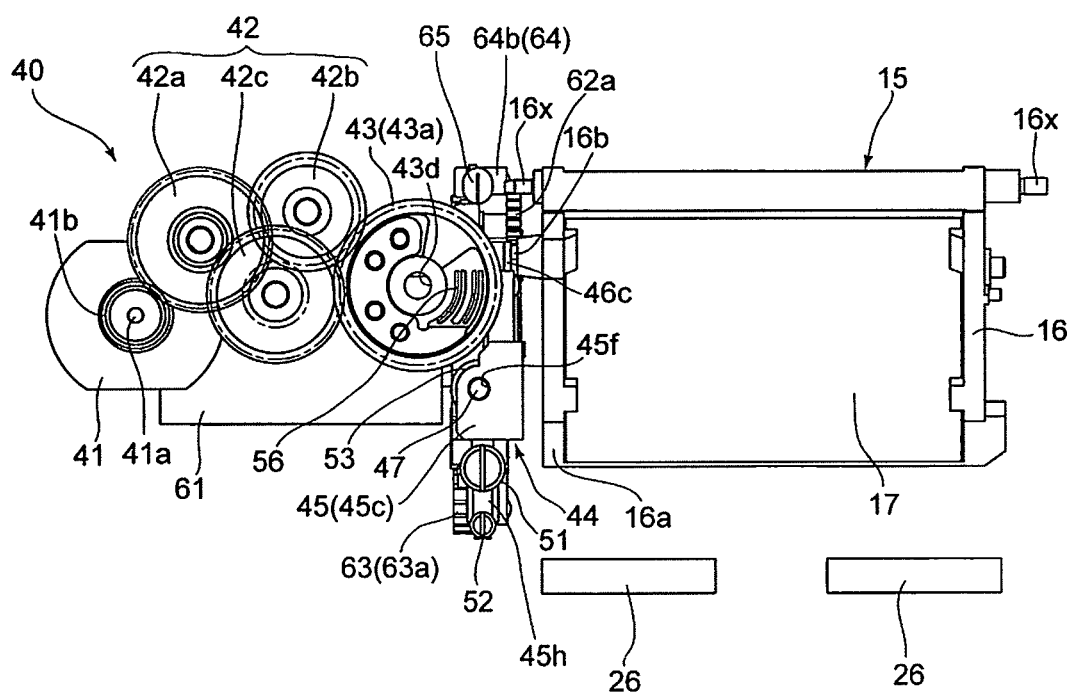
FIG. 10 is a top view of the mirror drive mechanism and the shutter charge mechanism of the first embodiment of the SLR camera.

The mirror drive motor 41 is disposed so that the lengthwise direction thereof extends in the upward/downward direction, and the rotational output shaft 41a projects upward from the mirror drive motor 41. A pinion 41b is fixedly fitted on the rotational output shaft 41a, so that the rotational output shaft 41a and the pinion 41b integrally rotate. The reduction gear train 42 is configured of a first reduction gear 42a, a second reduction gear 42b and an idle gear 42c, and the gears 42a, 42b and 42c of the reduction gear train 42 and the end-face cam gear 43 are each supported to be rotatable about a rotational shaft extending parallel to the rotational output shaft 41a of the mirror drive motor 41 (i.e., extending in the upward/downward direction). Each of the first reduction gear 42a and the second reduction gear 42b is a double gear consisting of a large-diameter gear and a small-diameter gear. The pinion 41b is in mesh with the large-diameter gear of the first reduction gear 42a, the small-diameter gear of the first reduction gear 42a is in mesh with the large-diameter gear of the second reduction gear 42b, and the small-diameter gear of the second reduction gear 42b is in mesh with the idle gear 42c. As shown in FIGS. 8 and 10, the pinion 41b is located at a position near the battery chamber 32 in the leftward/rightward direction, the end-face cam gear 43 is located at a position near a side of the mirror box 14 in the leftward/rightward direction, and the reduction gear train 42 is arranged in such a manner as to fill in the space between the pinion 41b and the end-face cam gear 43 that are spaced from each other in the leftward/rightward direction.

Figure 11:
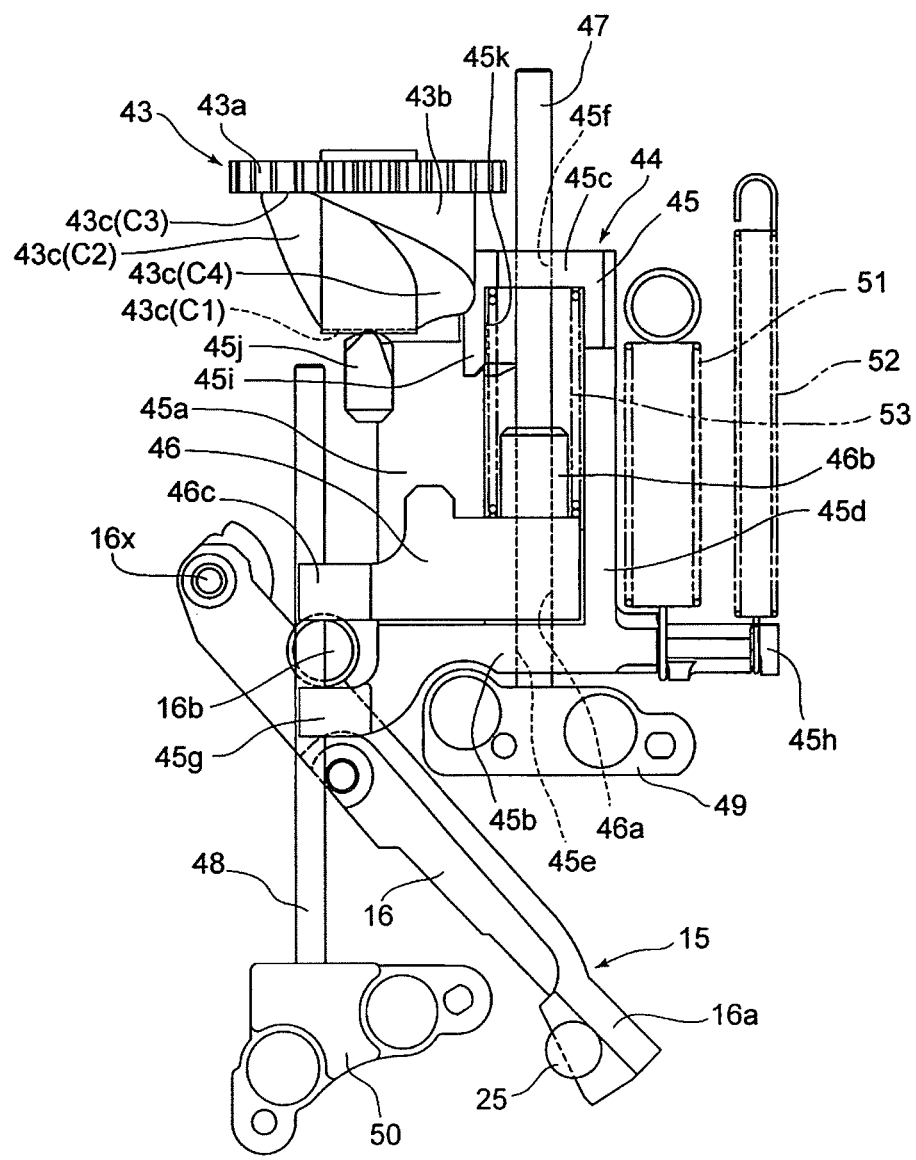
FIG. 11 is a side elevational view of the mirror drive mechanism of the first embodiment of the SLR camera in a mirror-down state.

The end-face cam gear 43 is provided with a gear portion 43a which is in mesh with the idle gear 42c and a cylindrical cam portion 43b which is formed on the underside of the gear portion 43a. An end-face cam 43c which faces downward is formed on the cylindrical cam portion 43b. The end-face cam 43c is provided with a mirror-down holding surface C1 which is positioned in a lower part of the end-face cam 43c at a position farthest from the gear portion 43a (i.e., which is great in the amount of projection in the axial direction), a mirror-up allowing surface C3 which is positioned in an upper part of the end-face cam 43c at a position close to the gear portion 43a (i.e., which is small in the amount of projection in the axial direction) and a spiral cam surface which connects the mirror-down holding surface C1 and the mirror-up allowing surface C3. As shown in FIG. 11, this spiral cam surface is provided with a mirror-up cam surface C2 and a mirror-down cam surface C4. The mirror-up cam surface C2 is greater in inclination (amount of displacement in the axial direction per unit of rotation angle of the end-face cam gear 43) than that of the mirror-down cam surface C4. The mirror drive mechanism 40 is provided, on top of the end-face cam gear 43, with a contact brush 56 (see FIG. 10) which is fixedly mounted thereto, and a code plate 54 with which the contact brush 56 is in slidable contact is fixedly provided immediately above the contact brush 56 (see FIG. 2). The rotational position of the end-face cam gear 43 can be detected from the relative contact position between the contact brush 56 and the code plate 54.

The reduction gear train 42 and the end-face cam gear 43 are supported on a mirror drive gear block casing 72 which is fixed to the mirror box 14 and the rear fixed plate 31 and are retained from above by a mirror drive gear block cover 73. The code plate 54 is fixed to the mirror drive gear block cover 73. The mirror drive motor 41 is fixed at the upper end thereof, from which the upper end of the rotational output shaft 41a juts out, to the mirror drive gear block casing 72 by screw or the like.

Figure 15:
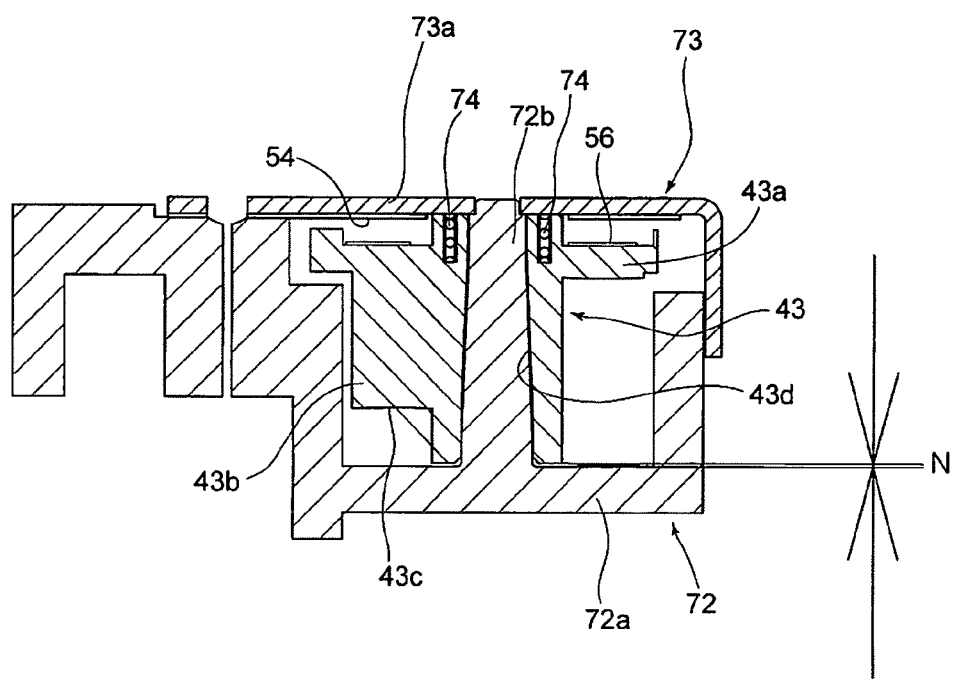
FIG. 15 is a cross sectional view of an end-face cam gear, taken along the line XV-XV shown in FIG. 3.
Figure 16:
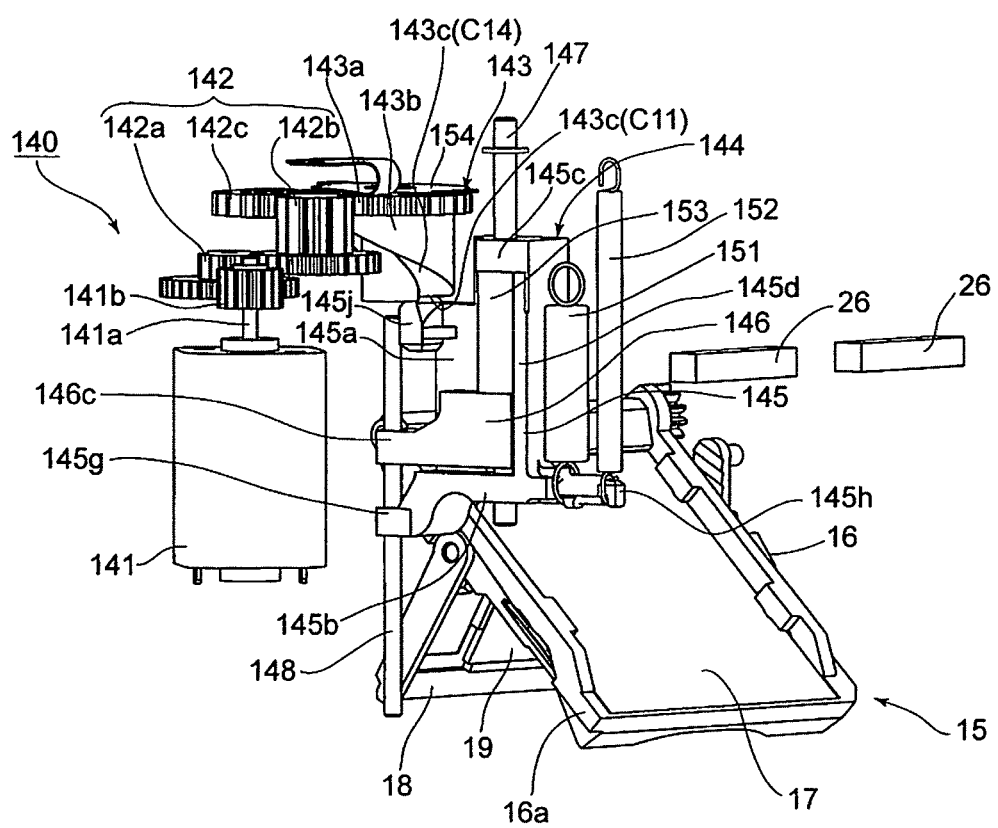
FIG. 16 is a perspective view of the mirror drive mechanism provided in a second embodiment of the SLR camera according to the present invention in the mirror-down state.

FIG. 15 shows a portion which holds the end-face cam gear 43 using the mirror drive gear block casing 72 and the mirror drive gear block cover 73. The mirror drive gear block casing 72 is provided, on a bottom wall 72a which constitutes a part of the mirror drive gear block casing 72, with a fixed shaft 72b which projects upward, and the end-face cam gear 43 is rotatably supported by the fixed shaft 72b with the fixed shaft 72b inserted into a shaft hole 43d of the end-face cam gear 43. The end-face cam gear 43 is prevented from coming off the fixed shaft 72b by an upper wall 73a, which constitutes part of the mirror drive gear block cover 73. The distance between the bottom wall 72a and the upper wall 73a in the upward/downward direction is slightly greater than the length of the end-face cam gear 43 in the axial direction thereof, so that a clearance N is provided which allows the end-face cam gear 43 to move slightly in the upward/downward direction between the bottom wall 72a and the upper wall 73a. The end-face cam gear 43 is biased downward in a direction to approach the bottom wall 72a (i.e., in the downward direction) by a cam-follower shock-absorbing spring (end-face cam biaser) 74.

The mirror drive mechanism 40 is provided, in the vicinity of a side (the left side with respect to FIG. 2) of the mirror box 14 at different positions in the forward/rearward direction, with a first guide shaft 47 and a second guide shaft 48 which extend in the upward/downward direction. The upper end of the first guide shaft 47 is fixed to a holding portion formed on the mirror box 14, and the lower end of the first guide shaft 47 is fixed to a retaining plate 49 fixed to the mirror box 14. The upper end of the second guide shaft 48 is fixed to a holding portion formed on the mirror box 14, and the lower end of the second guide shaft 48 is fixed to a retaining plate 50 fixed to the mirror box 14. In this fixed state, the first guide shaft 47 and the second guide shaft 48 are provided to extend parallel to each other.

The slider 44 is configured of a first slider 45, a second slider 46, and a slider coupling spring (resilient connecting member) 53 which resiliently connects the first slider 45 and second slider 46. The first slider 45 is provided with a side plate 45a which faces a side of the mirror box 14, and is further provided with a lower wall (clearance limit portion) 45b, an upper wall 45c and a connecting wall 45d which project from the side plate 45a away from the mirror box 14.

Figure 14:
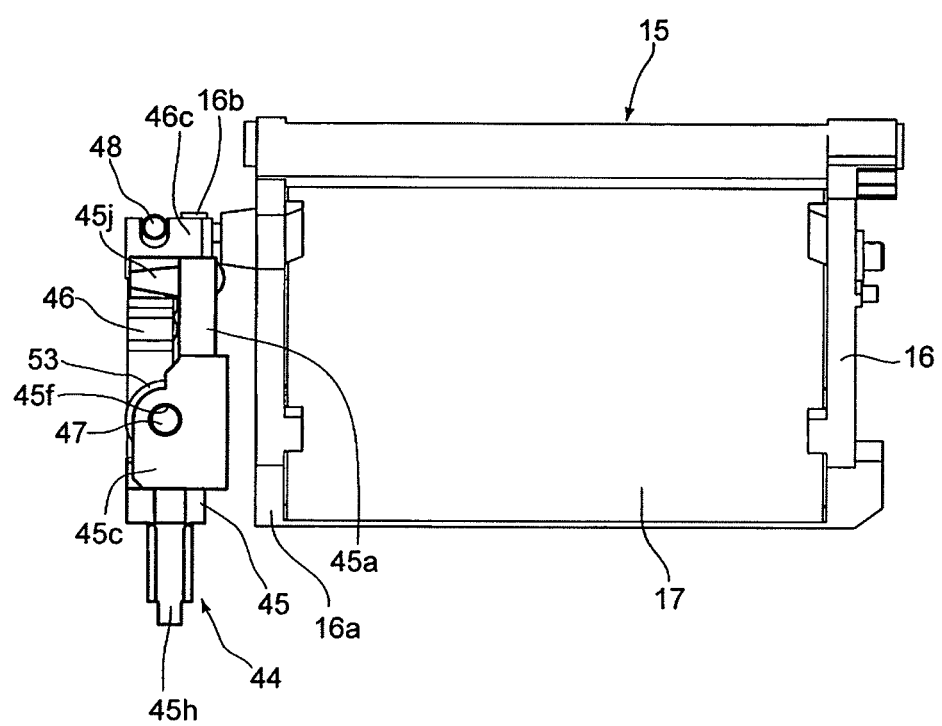
FIG. 14 is a top view of the mirror drive mechanism of the first embodiment of the SLR camera.

The lower wall 45b and the upper wall 45c are spaced from each other in the upward/downward direction, each extend in the forward/rearward direction, and the fronts of the lower wall 45b and the upper wall 45c are connected by the connecting wall 45d. Accordingly, the lower wall 45b, the upper wall 45c and the connecting wall 45d form a U-shaped frame portion which opens to the rear. Guide holes 45e and 45f, into which the first guide shaft 47 is inserted to be freely slidable therein, are formed through the lower wall 45b and the upper wall 45c, respectively, and the slider 45 is guided in the upward/downward direction along the first guide shaft 47 to be linearly movable in the upward/downward direction. The lower wall 45b is provided at a rear end thereof with a mirror press portion (first contact portion) 45g. The mirror press portion 45g has a bifurcated shape to hold the second guide shaft 48, and the engagement between the mirror press portion 45g and the second guide shaft 48 prevents the first slider 45 from rotating about the first guide shaft 47. Although a relationship between a mirror press portion 46c of the second slider 46 which will be discussed in detail later and the second guide shaft 48 is illustrated in FIG. 14, the mirror press portion 45g and the mirror press portion 46c are identical in cross sectional shape and hold the second guide shaft 48.

The first slider 45 is further provided with a spring hook arm 45h which projects from the front of the lower wall 45b, and the lower ends of a first mirror-up spring (slider biaser) 51 and a second mirror-up spring (slider biaser) 52 are hooked on the spring hook arm 45h. The upper ends of the first mirror-up spring 51 and the second mirror-up spring 52 are hooked on spring hook portions 14a and 14b (see FIG. 6) formed on the mirror box 14, respectively. The first mirror-up spring 51 and the second mirror-up spring 52 are extension springs which bias and move the first slider 45 upward. In addition, the first slider 45 is provided on top thereof with a rear wall 45i which is positioned behind the connecting wall 45d in the forward/rearward direction with the upper wall 45c positioned between the rear wall 45i and the connecting wall 45d. An area surrounded by the side plate 45a, the upper wall 45c, the connecting wall 45d and the rear wall 45i serves as a cylindrical spring retaining portion 45k which is open downward.

The first slider 45 is provided on an upper part of the side plate 45a with a cam follower 45j, formed as a protrusion which is positioned behind the rear wall 45i. The upper end of the cam follower 45j is located at a position facing against the end-face cam 43c of the end-face cam gear 43 (see FIG. 11), and the biasing force of the first mirror-up spring 51 and the second mirror-up spring 52 acts on the first slider 45 in a direction to bring the cam follower 45j into contact with the end-face cam 43c. As shown in FIGS. 9 and 11 through 13, the cam follower 45j is positioned between the first guide shaft 47 and the second guide shaft 48 in the forward/rearward direction. The cam follower 45j is formed as a protrusion the lengthwise direction of which extends parallel to the axes of the first guide shaft 47 and the second guide shaft 48. The portion of the cam follower 45j which abuts against the end-face cam 43c is shaped so that a component of pressure force in the upward/downward direction (in a direction parallel to the axes of the first guide shaft 47 and the second guide shaft 48) occurs between the cam follower 45j and the mirror-up cam surface C2, and between the cam follower 45j and the mirror-down cam surface C4, in accordance with rotation of the end-face cam gear 43.

The second slider 46 is positioned in a space surrounded by the side plate 45a, the lower wall 45b, the upper wall 45c and the connecting wall 45d of the first slider 45, and is provided with a guide hole (through-hole) 46a into which the first guide shaft 47 is inserted to be freely slidable therein. The second slider 46 is provided with a guide projection 46b which projects upward, and the guide hole 46a extends completely through the second slider 46 (from the bottom of the second slider 46 through to the upper end of the guide projection 46b). Similar to the first slider 45, the second slider 46 is guided to be linearly movable in the upward/rearward direction along the first guide shaft 47. The second slider 46 is provided with a mirror press portion (second contact portion) 46c which is bifurcated to hold the second guide shaft 48, and the engagement between the mirror press portion 46c and the second guide shaft 48 prevents the second slider 46 from rotating about the first guide shaft 47 (see FIG. 14).

The slider coupling spring 53 is inserted in between the upper wall 45c of the first slider 45 and an upper surface of the second slider 46. The slider coupling spring 53 is a compression coil spring, into which the first guide shaft 47 is inserted. The slider coupling spring 53 can expand and contract in the axial direction thereof without buckling due to the structure in which the guide projection 46b is inserted into the lower end of the slider coupling spring 53, the upper end of the slider coupling spring 53 is inserted into the spring retaining portion 45k and the slider coupling spring 53 is in contact with the rear surface of a cover plate 71, which is fixed to a side of the mirror box 14. The slider coupling spring 53 biases the second slider 46 in a direction to make the second slider 46 come into contact with the lower wall 45b of the first slider 45, and the first slider 45 and the second slider 46 are elastically connected by this biasing force to constitute the slider 44. The slider 44 is biased to move upward as a whole by the biasing force of the first mirror-up spring 51 and the second mirror-up spring 52. The biasing force of the slider coupling spring 53 is set to be greater than the biasing force of a combination of the first mirror-up spring 51 and the second mirror-up spring 52. Although two springs, the first mirror-up spring 51 and the second mirror-up spring 52, are installed in the above illustrated embodiment of the mirror drive mechanism 40, the slider 44 can be biased to move upward by a single spring.

Figure 13:
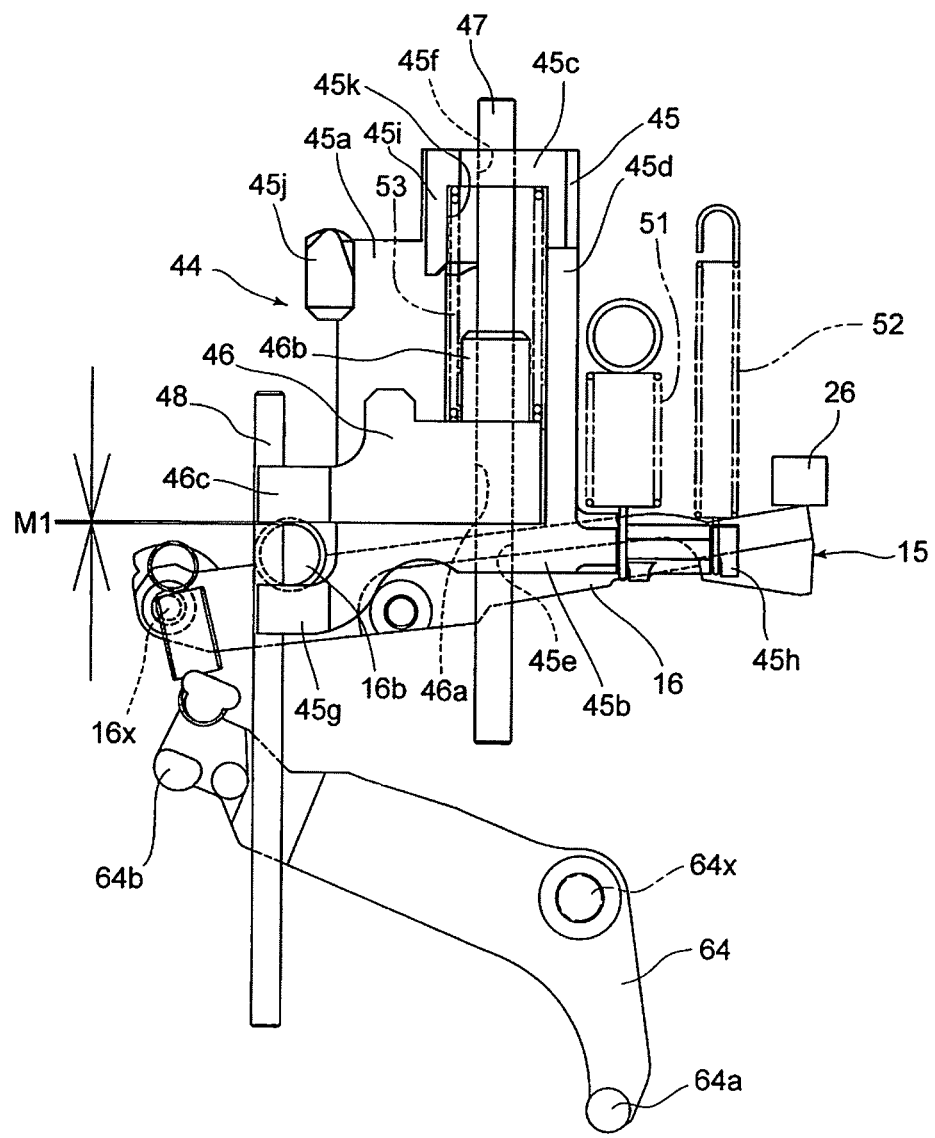
FIG. 13 is a side elevational view of components of the mirror drive mechanism and the shutter charge mechanism of the first embodiment of the SLR camera in a mirror-up state.

The main-mirror holding frame 16 is provided on a side thereof, in the vicinity of the left main mirror support shaft 16x as viewed from the front, with a mirror seat boss (pressed portion) 16b (see FIG. 8) which projects in a direction to approach the slider 44. The mirror seat boss 16b is cylindrical in outer peripheral shape. The mirror press portion 45g of the first slider 45 and the mirror press portion 46c of the second slider 46 face each other in the upward/downward direction with the mirror seat boss 16b positioned therebetween, and the mirror press portion 45g and the mirror press portion 46c are positioned immediately below and above the mirror seat boss 16b, respectively. The first slider 45 and the second slider 46 are movable relative to each other in the upward/downward direction, and the distance between the mirror press portion 45g and the mirror press portion 46c varies in accordance with relative movement between the first slider 45 and the second slider 46. The distance between the mirror press portion 45g and the mirror press portion 46c becomes minimum when the lower surface of the second slider 46 contacts the lower wall 45b of the first slider 45 by the biasing force of the slider coupling spring 53 as shown in FIG. 13, and this minimum distance between the mirror press portion 45g and the mirror press portion 46c at this time is set to be slightly greater than the diameter of the mirror seat boss 16b. The difference between the diameter of the mirror seat boss 16b and the minimum distance between the mirror press portion 45g and the mirror press portion 46c will be hereinafter referred to as the "minimum clearance M1".

The slider 44 makes the movable mirror 15 operate by moving in the upward/downward direction. Downward movement of the slider 44 causes the mirror press portion 46c to press the mirror seat boss 16b downward, thus causing the movable mirror 15 to rotate toward the mirror-down position, and upward movement of the slider 44 causes the mirror press portion 45g to press the mirror seat boss 16b upward, thus causing the movable mirror to rotate toward the mirror-up position.

Operations of the mirror drive mechanism 40 will be discussed hereinafter. FIGS. 2 and 5 through 12 show the mirror-down state, in which the movable mirror 15 is in the mirror-down position. In this state, the slider 44 is in a mirror-down holding position, in which the slider 44 holds the movable mirror 15 in the mirror-down position. More specifically, in the mirror-down state, the first slider 45 is positioned at a lower position against the biasing force of the first mirror-up spring 51 and the second mirror-up spring 52 due to the cam follower 45j being pressed by the mirror-down holding surface C1 of the end-face cam 43c that is formed on the end-face cam gear 43. The second slider 46 is also positioned at a lower position in association with the first slider 45, and the movable mirror 15 is held in the mirror-down position due to the mirror seat boss 16b being pressed downward by the mirror press portion 46c. The strength of the biasing force of the slider coupling spring 53 is set so that the second slider 46 does not solely move upward away from the first slider 45 and can maintain the pressure of the mirror seat boss 16b caused by the mirror press portion 46c.

Figure 12:
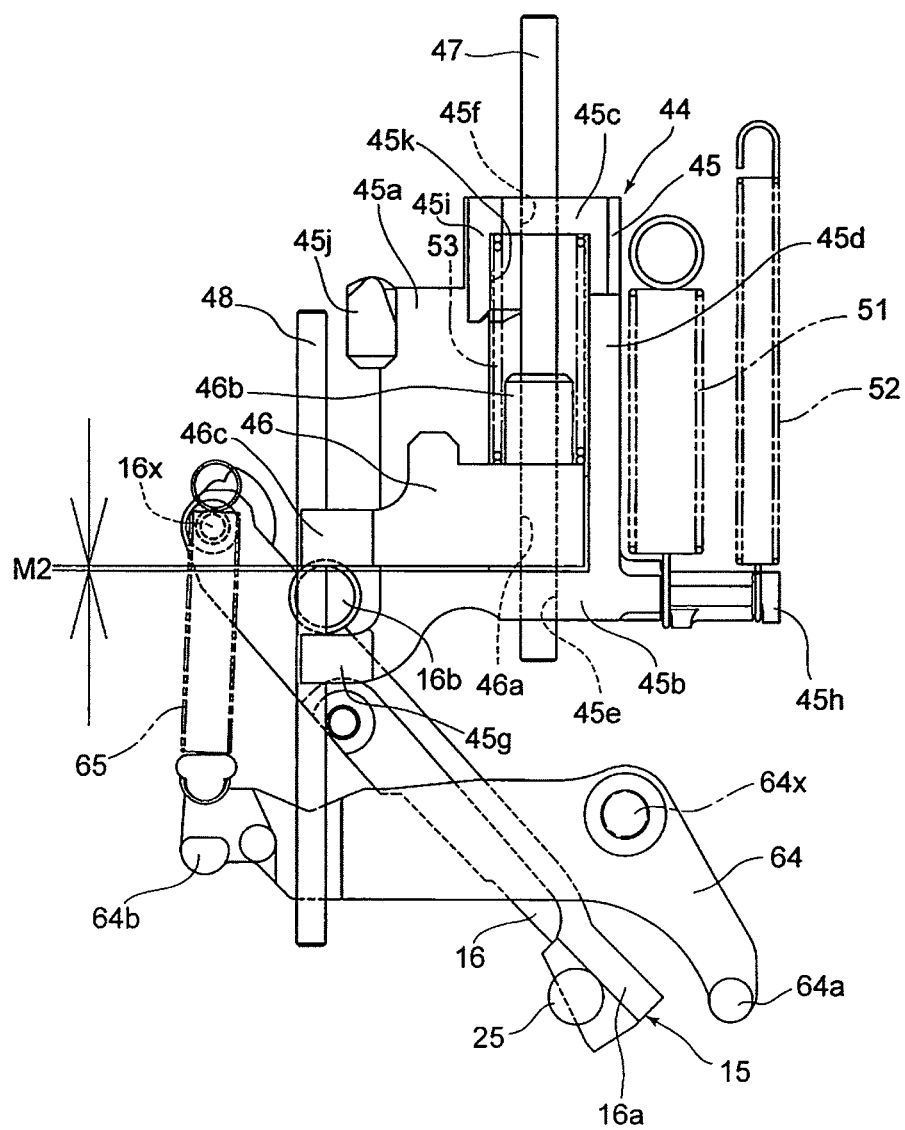
FIG. 12 is a side elevational view of components of the mirror drive mechanism and the shutter charge mechanism of the first embodiment of the SLR camera in the mirror-down state.

As shown in FIG. 12, in the mirror-down state, an enlarged clearance M2, which is greater than the aforementioned minimum clearance M1, defined by the difference between the diameter of the mirror seat boss 16b and an enlarged distance between the mirror press portion 45g of the first slider 45 and the mirror press portion 46c of the second slider 46 exists, and the mirror press portion 45g is disengaged downward from the mirror seat boss 16b. Namely, when the movable mirror 15 is in the mirror-down position, the second slider 46 is prevented from moving further downward due to the engagement between the mirror press portion 46c and the mirror seat boss 16b, while the first slider 45 has been moved (overcharged) downward by a relatively large amount with respect to the second slider 46 due to the cam follower 45j being pressed by the mirror-down holding surface C1 of the end-face cam 43c. Providing the enlarged clearance M2 defined by the difference between the diameter of the mirror seat boss 16b and an enlarged distance between the mirror press portion 45g of the first slider 45 and the mirror press portion 16c of the second slider 46 with the first slider 45 held in the overcharged position in this manner makes it possible to perform a high-precision positioning of the movable mirror 15 without the first slider 45 exerting an influence on the setting of the mirror-down position of the movable mirror 15 that is defined by the engagement between the mirror seat boss 16b and the mirror-down position defining protrusion 25. Specifically when the movable mirror 15 is in the mirror-down position, the position of the movable mirror 15 is required to be precisely set for a distance measurement operation and a photometering operation; moreover, a margin for estimation of the position adjustment for the movable mirror 15 by the mirror-down position defining protrusion 25 is also required, so that it is effective to absorb error by providing the enlarged clearance M2.

In the case where a user of the camera 10 lifts the movable mirror 15 by a finger or the like toward the mirror-up position in the mirror-down state, the mirror seat boss 16b presses the mirror press portion 46c upward, which causes the second slider 46 to move upward while charging the slider coupling spring 53. At this time, the first slider 45 does not move upward, and differential movement of the second slider 46 relative to the first slider 45 is absorbed by the slider coupling spring 53, which prevents excessive load on the mirror drive mechanism 40, thus making it possible to prevent damage to the mirror drive mechanism 40 that may be caused by such excessive load. Upon the lifting of the movable mirror 15 being released, the second slider 46 returns to the lower position while releasing the charged slider coupling spring 53, so that also the movable mirror 15 returns to the mirror-down position.

Upon a signal for an operation such as a shutter release or a live view operation that is accompanied by a mirror-up operation of the movable mirror 15 being input to a controller of the camera body 11 in the mirror-down state, the mirror drive motor 41 is driven to rotate the end-face cam gear 43, which causes the mirror-down holding surface C1 of the end-face cam 43c to move aside from a position facing the cam follower 45j, which in turn makes the mirror-up cam surface C2 of the end-face cam 43c face against the cam follower 45j. Thereupon, the slider 44 is released from the restriction on upward movement thereof and moves upward from the mirror-down holding position by the biasing force of the first mirror-up spring 51 and the second mirror-up spring 52. This causes the mirror press portion 45g, of the first slider 45 of the slider 44 that moves up, to lift the mirror seat boss 16b, thus causing the movable mirror 15 to rotate toward the mirror-up position. When the slider 44 moves up, the overcharge of the first slider 45 with respect to the second slider 46 is released, so that the clearance on the slider 44 side with respect to the mirror seat boss 16b changes from the enlarged clearance M2 to the minimum clearance M1, which is defined (limited) by the lower wall 45b of the first slider 45 abutting against the second slider 46. Since the minimum clearance M1 is secured, no frictional resistance occurs between the mirror seat boss 16b and each of the first slider 45 and the second slider 46, even though the mirror seat boss 16b is positioned between the first slider 45 and the second slider 46, which enables smooth mirror-up operation of the movable mirror 15. In addition, an improvement in durability of the mirror drive mechanism 40 is achieved.

At an initial stage of the mirror-up operation of the movable mirror 15, the cam follower 45j is disengaged from the mirror-up cam surface C2 because the upward movement of the slider 44 is influenced by inertia of the movable mirror 15; however, the upward movement of the slider 44 catches up with the recessed shape (inclination) of the mirror-up cam surface C2 in the middle of the mirror-up operation of the movable mirror 15 to cause the cam follower 45j to come into contact with the mirror-up cam surface C2. Thereupon, the slider 44 presses the end-face cam gear 43 upward against the biasing force of the cam-follower shock-absorbing spring 74 (see FIG. 15), and the end-face cam gear 43 moves upward by an amount corresponding to the aforementioned clearance N while compressing the cam-follower shock-absorbing spring 74. With this operation, a damper effect for the mirror-up operation of the movable mirror 15 is obtained. Supposing the movable mirror 15 were to reach the mirror-up position without such a damper effect, the movable mirror 15 would come into contact (collide) with the mirror-up shock-absorbing member 26 at a high speed that would be maintained since the commencement of swing-up operation of the movable mirror 15, which may increase shock and bouncing of the movable mirror 15. By contrast, according to the present invention, shock and bouncing of the movable mirror 15 when the movable mirror 15 moves to the mirror-up position can be suppressed by absorbing the moving force of the slider 44 using the end-face cam gear 43 and the cam-follower shock-absorbing spring 74.

When the end-face cam gear 43 rotates to a position where the mirror-up allowing surface C3 faces against the cam follower 45j, the movable mirror 15 reaches the mirror-up position, which causes the slider 44 to be positioned in a mirror-up allowing position shown in FIG. 13. In this state (mirror-up state), the aforementioned minimum clearance M1 exists between the mirror press portion 46c and the mirror seat boss 16b, so that the slider 44 exerts no influence on the movable mirror 15 in the mirror-up position. In the mirror-up state, an exposure operation or a live view operation (in which an electronic object image captured by the image sensor 21 is viewed in real-time on the LCD monitor 29 before photographing) can be carried out by actuating the shutter 20.

In response to a transition signal from the mirror-up state to the mirror-down state, the mirror drive motor 41 is driven to rotate the end-face cam gear 43. The rotation direction of the end-face cam gear 43 at this time is a direction to change the area of the end-face cam 43c that faces against the cam follower 45j from the mirror-up allowing surface C3 to the mirror-down cam surface C4. The mirror-down cam surface C4 is an inclined surface which increases in downward projecting amount in a direction to approach the mirror-down holding surface C1 away from the mirror-up allowing surface C3, and accordingly, rotation of the end-face cam gear 43 in this direction causes the mirror-down cam surface C4 to gradually press the cam follower 45j downward, which causes the slider 44 to move downward from the mirror-up allowing position against the biasing force of the first mirror-up spring 51 and the second mirror-up spring 52. This downward movement of the slider 44 causes the mirror press portion 46c of the second slider 46 to press the mirror seat boss 16b to thereby rotate the movable mirror 15 from the mirror-up position toward the mirror-down position. Thereafter, upon the end-face cam gear 43 reaching a rotational position thereof where the mirror-down holding surface C1 comes into contact with the cam follower 45j, the slider 44 reaches the mirror-down holding position so that the movable mirror 15 is held in the mirror-down position.

Figure 6:
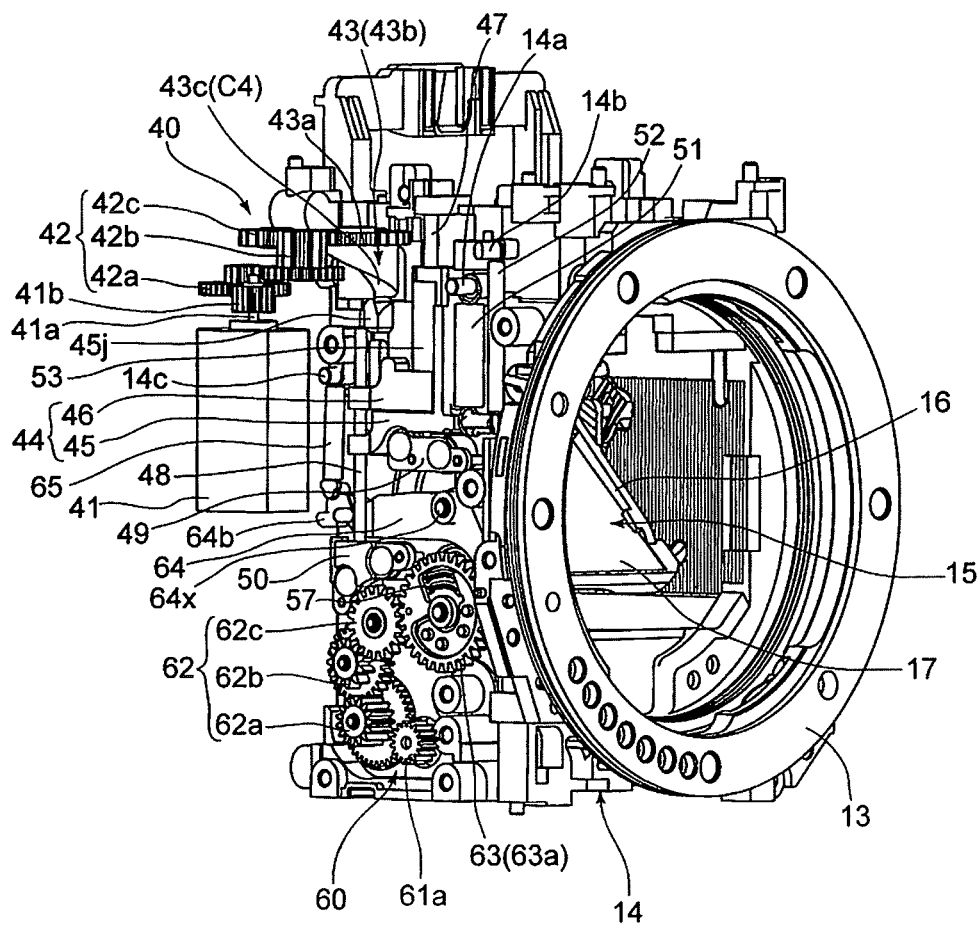
FIG. 6 is a perspective view of the first embodiment of the SLR camera, showing an internal structure thereof with the battery chamber and some other components shown in FIG. 5 removed.
Figure 7:
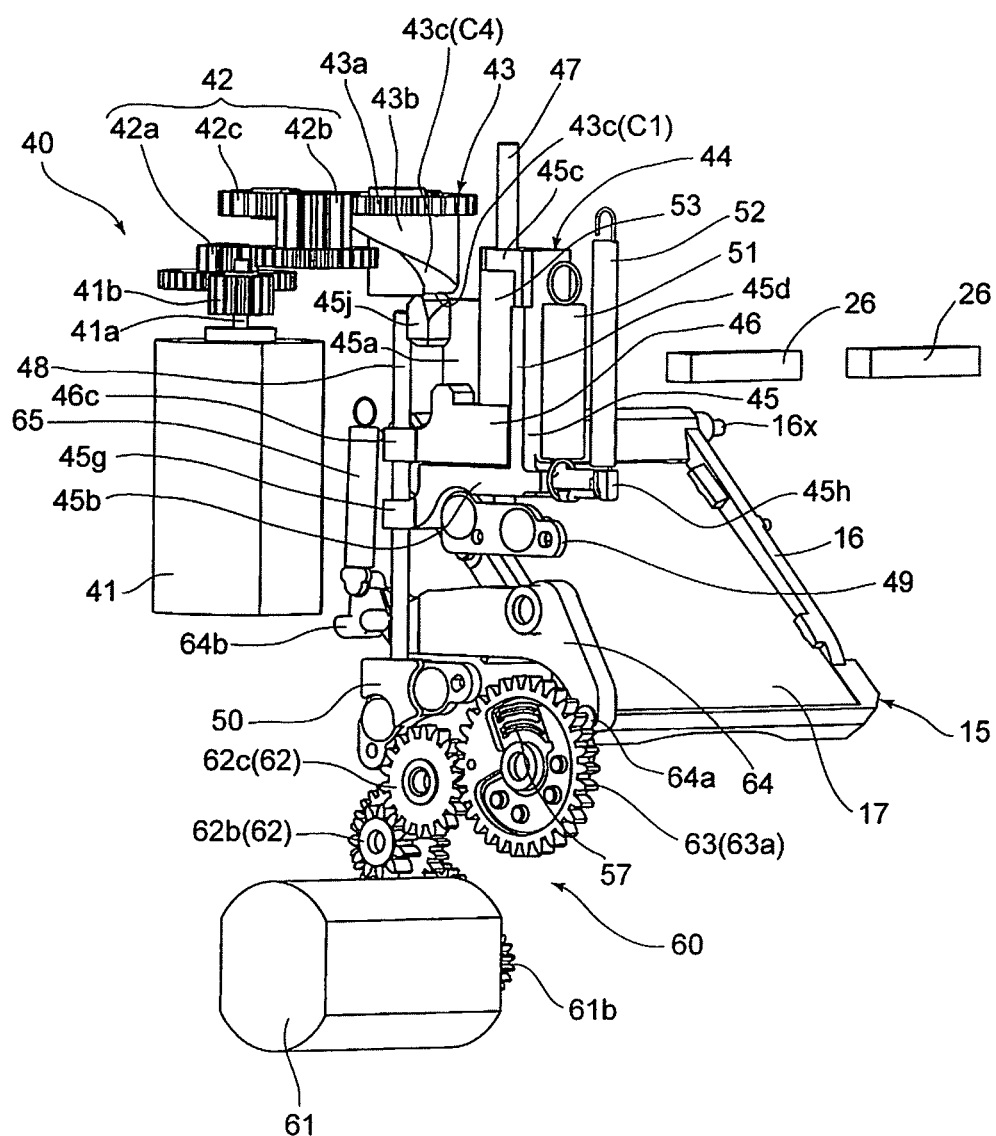
FIG. 7 is a perspective view of a mirror drive mechanism and a shutter charge mechanism which are provided in the first embodiment of the SLR camera.

The shutter charge mechanism 60 will be discussed hereinafter. The shutter charge mechanism 60 is provided with a shutter charge motor 61, a reduction gear train (shutter-charge gear train) 62 which transmits a driving force of the shutter charge motor 61, a peripheral-cam-integrated gear (peripheral-cam-integrated member) 63 to which the driving force of the shutter charge motor 61 is transmitted via the reduction gear train 62, and a shutter charge lever 64. As shown in FIG. 6, the gears of the reduction gear train 62, the peripheral-cam-integrated gear 63 and the shutter charge lever 64 are each supported on a side of the mirror box 14 and are each rotatable about a rotational shaft extending substantially parallel to the pair of main mirror support shafts 16x. As shown in FIGS. 2 and 8, the mirror drive mechanism 40 is arranged in an upper half of the space between the mirror box 14 and the battery chamber 32, whereas the shutter charge mechanism 60 is arranged in a lower half of the space between the mirror box 14 and the battery chamber 32.

The shutter charge motor 61 is arranged in the lowermost space between the mirror box 14 and the battery chamber 32 so that the lengthwise direction of the shutter charge motor 61 extends in the leftward/rightward direction, and a rotational output shaft 61a of the shutter charge motor 61 on which a pinion 61b is fixedly fitted projects in a direction to approach the mirror box 14 (in the rightward direction with respect to FIG. 2). The reduction gear train 62 is configured of a first reduction gear 62a, a second reduction gear 62b and an idle gear 62c in that order from down (position closer to the pinion 61b) to up. Each of the first reduction gear 62a and the second reduction gear 62b is a double gear consisting of a large-diameter gear and a small-diameter gear. The pinion 61b is in mesh with the large-diameter gear of the first reduction gear 62a, the small-diameter gear of the first reduction gear 62a is in mesh with the large-diameter gear of the second reduction gear 62b, and the small-diameter gear of the second reduction gear 62b is in mesh with the idle gear 62c.

The peripheral-cam-integrated gear 63 is positioned above the pinion 61b. The peripheral-cam-integrated gear 63 is provided on the outer periphery thereof with an outer peripheral gear portion 63a which is in mesh with the idle gear 62c, and is further provided on the inner periphery of the outer peripheral gear portion 63a with a peripheral cam 63b (see FIG. 8). The shutter charge mechanism 60 is provided with a contact brush 57 which is fixedly mounted on the peripheral-cam-integrated gear 63, and the rotational position of the peripheral-cam-integrated gear 63 can be detected from the relative contact position between the contact brush 57 and a code plate (not shown) installed inside the camera body 11.

The shutter charge lever 64 is pivoted about a charge-lever pivot 64x which extends substantially parallel to the pair of main mirror support shafts 16x. The shutter charge lever 64 is provided with a front arm and a rear arm which extend in the forward/rearward direction from the pivoted portion about the charge-lever pivot 64x. The shutter charge lever 64 is provided at the front arm with a cam follower 64a which is in contact with the peripheral cam 63b, and the shutter charge lever 64 is provided at the rear arm with a shutter charge press portion 64b. The shutter charge press portion 64b is the portion of the shutter charge lever 64 that presses a charge member (not shown) provided in the shutter drive unit 35 to charge the shutter 20. In addition, the shutter charge mechanism 60 is provided with a charge lever spring 65, the lower end of which is hooked on a portion of the shutter charge lever 64 that is positioned above the shutter charge press portion 64b. The upper end of the charge lever spring 65 is hooked onto a spring hook 14c (see FIG. 6) formed on the mirror box 14. The charge lever spring 65 is an extension spring which biases and rotates the shutter charge lever 64 in a direction to make the cam follower 64a abut against the peripheral cam 63b (clockwise with respect to FIGS. 9, 12 and 13).

As shown in FIGS. 2 through 5, the slider 44, which constitutes a component of the mirror drive mechanism 40, and the reduction gear train 62, the peripheral-cam-integrated gear 63 and the shutter charge lever 64, which constitute components of the shutter charge mechanism 60, are covered with the cover plate 71 and held between the cover plate 71 and the mirror box 14. The shutter charge motor 61 is fixed, at the end thereof from which the rotational output shaft 61a projects, to the cover plate 71 by a fixing device such as screw. The shutter drive unit 35 is positioned between the mirror drive motor 41 and the cover plate 71 in the leftward/rightward direction and positioned between the mirror drive gear block casing 72 and the shutter charge motor 61 in the upward/downward direction. The shutter drive unit 35 is fixed to the rear fixed plate 31.

Operations of the shutter charge mechanism 60 will be discussed hereinafter. In the mirror-down state shown in FIGS. 2 and 5 through 12, the shutter charge lever 64 is held with the cam follower 64a pressed by the peripheral cam 63b and with the charge lever spring 65 extended. When the movable mirror 15 is rotated from the mirror-down position to the mirror-up position, the shutter charge motor 61 is driven to rotate the peripheral-cam-integrated gear 63. This rotation of the peripheral-cam-integrated gear 63 causes the peripheral cam 63b to be disengaged from the cam follower 64a to thus stop pressing the cam follower 64a and causes the shutter charge lever 64 (the cam follower 64a of which has been just released from the pressure of the peripheral cam 63b) to rotate in a direction to make the shutter charge press portion 64b move upward by the biasing force of the charge lever spring 65 (see FIG. 13). Subsequently, when the movable mirror 15 returns to the mirror-down position, the shutter charge motor 61 is driven to further rotate the peripheral-cam-integrated gear 63 in the same rotational direction. This rotation of the peripheral-cam-integrated gear 63 causes the peripheral cam 63b to press the cam follower 64a, which causes the shutter charge lever 64 to rotate in a direction to make the shutter charge press portion 64b move downward against the biasing force of the charge lever spring 65. In other words, when the movable mirror 15 performs a reciprocating rotational motion in which the movable mirror 15 rotates from the mirror-down position to the mirror-up position and then back to the mirror-down position, the shutter charge lever 64 performs a reciprocating rotational motion in which the shutter charge lever 64 moves the shutter charge press portion 64b up and subsequently down. When the shutter charge lever 64 moves the shutter charge press portion 64b from up to down, the shutter charge press portion 64b presses the aforementioned charge member (not shown) provided in the shutter drive unit 35 to charge the shutter 20. In the live view mode, the shutter 20 is charged by moving the shutter charge lever 64 without making the movable mirror 15 rotate to the mirror-down position from the mirror-up position. The structure of the mechanism for charging the shutter 20 which is provided in the shutter drive mechanism 35 is known in the art, so that the description of this structure will be omitted from the following description.

In the above described first embodiment of the camera, the mirror drive mechanism 40, the shutter drive unit 35 and the shutter charge mechanism 60 are arranged in the space between a side (left side with respect to FIG. 2) of the mirror box 14 and the battery chamber 32, which contributes to the reduced number of components arranged alongside the other side (right side with respect to FIG. 2) of the mirror box 14, thus making it possible to achieve miniaturization of the camera in the leftward/rightward direction. In addition, the camera 10 is superior in weight balance when the grip thereof is held by hand because various drive mechanisms are integrated and arranged in the vicinity of the grip of the camera 10 that is hand-held by the user. However, since the movable mirror and the shutter 20 are positioned at approximately the center of the camera 10 with respect to the upward/downward direction as shown in FIGS. 1 and 2, if mechanisms associated with the driving of the movable mirror 15 and the shutter 20 are attempted to be simply arranged alongside the movable mirror 15 and the shutter 20, respectively, such mechanisms cannot be easily arranged in this manner because components of the mechanisms are concentrated in a part of the aforementioned space (i.e., the space between a side of the mirror box 14 and the battery chamber 32). To resolve this problem, in the above described embodiment of the camera, the mirror drive mechanism 40 is arranged in an upper half of the space between the mirror box 14 and the battery chamber 32, the shutter charge mechanism 60 is arranged in a lower half of the same space, and the shutter drive unit 35 is arranged in a space secured between the mirror drive mechanism 40 and the shutter charge mechanism 60. In regard to the mirror drive mechanism 40 in particular, the arrangement thereof makes it possible to suppress the size of the camera 10 in the upward/downward direction while preventing the mirror drive mechanism 40 from interfering with the shutter drive unit 35, and the features of the arrangement of the mirror drive mechanism 40 will be discussed hereinafter.

Among the elements of the mirror drive mechanism 40, the mirror press portion 45g and the mirror press portion 46c need to be arranged at positions that are contactable with the mirror seat boss 16b. As shown in FIGS. 11 through 13, the mirror seat boss 16b is provided on the main-mirror holding frame 16 at a radial position in the close vicinity of one of main mirror support shafts 16x (specifically, the left main mirror support shaft 16x as viewed from front) in a radial direction of rotation of the main-mirror holding frame 16, so that an effect of positioning the mirror press portion 45g and the mirror press portion 46c on an upper side in the mirror-down state can be obtained compared with the case where the mirror seat boss 16b is provided on the main-mirror holding frame 16 at a radial position far from the either of main mirror support shafts 16x in a radial direction of rotation of the main-mirror holding frame 16. Additionally, the arrangement in which the mirror seat boss 16b is formed at a radial position in the close vicinity of one of main mirror support shafts 16x in a radial direction of rotation of the main-mirror holding frame 16 allows the movable mirror 15 to move up and down via a small amount of movement of the slider 44. This makes it possible to reduce the thickness of (the cylindrical cam portion 43b of) the end-face cam gear 43, which controls upward and downward movements of the slider 44, in the axial direction, thus making it possible to reduce the height of the mirror drive mechanism 40, which includes the end-face cam gear 43, in the upward/downward direction.

The slider 44, which is configured of the first slider 45 and the second slider 46, is formed to extend upward from portions thereof on which the mirror press portion 45g and the mirror press portion 46c are formed, respectively, and the cam follower 45j is made to contact the end-face cam 43c of the end-face cam gear 43, which is provided above the mirror press portion 45g and the mirror press portion 46c. The end-face cam gear 43 is positioned above the pair of main mirror support shafts 16x in the upward/downward direction, and correspondingly, a major part of the slider 44 is positioned above the pair of main mirror support shafts 16x in the upward/downward direction in the mirror-down state also, in which the slider 44 is positioned at the lowermost position, as shown in FIGS. 8, 9, 11 and 12. In the mirror-up state shown in FIG. 13, almost the entire part of the slider 44 is positioned above the pair of main mirror support shafts 16x in the upward/downward direction.

As shown in FIGS. 6 through 10, the mirror drive motor 41, which serves an a drive source for rotating the end-face cam gear 43, is installed vertically with the lengthwise direction (i.e., the axial direction) of the mirror drive motor 41 extending parallel to the moving direction of the slider 44 at a position spaced from the slider 44 in the leftward/rightward direction. The pinion 41b of the mirror drive motor 41 is located at a position in the upward/downward direction which corresponds to the cylindrical cam portion 43b of the end-face cam gear 43, and the reduction gear train 42 is arranged in the space between the pinion 41b and the end-face cam gear 43 in the leftward/rightward direction.

By constructing the mirror drive mechanism 40 in the above described manner, a downwardly open space which is surrounded by the mirror drive motor 41, the reduction gear train 42, the end-face cam gear 43 and the slider 44 is formed, as shown in FIG. 8. In addition, the shutter charge lever 64, the peripheral-cam-integrated gear 63 and the reduction gear train 62 of the shutter charge mechanism 60 are arranged below the slider 44, and the shutter charge motor 61 is installed horizontally with the lengthwise direction (i.e., the axial direction) of the mirror drive motor 61 extending in the leftward/rightward direction at a position adjacent to the lowermost part of the reduction gear train 62. Accordingly, the camera body 11 is provided therein with a vertically-elongated space, the upper side of which is defined by the reduction gear train 42 and the end-face cam gear 43, the lower side of which is defined by the shutter charge motor 61, one lateral side of which is defined by the mirror drive motor 41 and the other lateral side of which is defined by the portion of the mirror drive mechanism 40 and the portion of the shutter charge mechanism 60 (covered by the cover plate 71) that ranges from the slider 44 to the reduction gear train 62. The shutter drive unit 35 is installed in this vertically-elongated space.

Unlike the mirror drive mechanism 40, the mirror drive mechanism of the camera 10 can be alternatively configured using a member similar to the peripheral-cam-integrated gear 63, rather than the end-face cam gear 43 of the present invention, as in the camera disclosed in Japanese Unexamined Patent Publication No. 2006-126389. A comparative example of the mirror drive mechanism to be compared with the mirror drive mechanism 40 will be discussed hereinafter. To distinguish this comparative example from the above described embodiment of the mirror drive mechanism, components similar to those of the above described embodiment but different in arrangement are designated by the same reference numerals to which apostrophes (') are added in the following description. In the case of the mirror drive mechanism of a type which uses a peripheral-cam-integrated gear to drive the movable mirror 15, the gears of the reduction gear train 42' are each supported on a side of the mirror box 14 to be rotatable about a rotational shaft parallel to the pair of main mirror support shafts 16*x* that extends in the leftward/rightward direction, similar to the gears 62*a*, 62*b* and 62*c* of the reduction gear train 62, and the mirror drive motor 41' is arranged so that the lengthwise direction thereof extends in the leftward/rightward direction, similar to the shutter charge motor 61. In addition, the end-face cam gear 43 and the slider 44 are replaced by a peripheral-cam-integrated gear and a mirror drive lever each of which is pivoted about a rotational shaft parallel to the pair of main mirror support shafts 16*x*. The driving force of the mirror drive motor 41' is transmitted to the peripheral-cam-integrated gear via the reduction gear train 42' to rotate the peripheral-cam-integrated gear, and this rotation of the peripheral-cam-integrated gear causes the mirror drive lever to move reciprocatively via the peripheral cam of the peripheral-cam-integrated gear, which causes the movable mirror 15 to rotate to the mirror-up position and then the mirror-down position. In the case where the mirror drive motor 41' is arranged horizontally in such a manner, it is conceivable that the mirror drive motor 41' may be arranged above the shutter drive unit 35 to be prevented from interfering with the shutter drive unit 35. Although the reduction gear train 42 is provided in a space above the shutter drive unit 35 in the above illustrated embodiment, the mirror drive motor 41' is still greater in height in the upward/downward direction than the reduction gear train 42 even in the case where the mirror drive motor 41' is horizontally arranged, which results in an increase in the amount of upward projection of the mirror drive mechanism, thus becoming a cause of an increase in size of the camera body.

In contrast to this comparative example, the mirror drive mechanism 40 of the present invention has been made compact in size in the upward/downward direction while being prevented from interfering with the shutter drive unit 35 because the mirror drive motor 41 is installed vertically with the lengthwise direction thereof extending along the lengthwise direction of the shutter drive unit 35 and due to the reduction gear train 42, which can be slimmed in size, being arranged above the shutter drive unit 35. In regard to the configuration of the camera body 11, the finger hooking recess 33*b* needs to have a certain degree of width in the leftward/rightward direction to allow fingers of the user to be inserted, and accordingly, a space having a sufficient width in the leftward/rightward direction is formed between the mirror box 14 and the battery chamber 32 that are arranged on both sides of the finger hooking recess 33*b*. The vertical arrangement of the mirror drive motor 41 and the shutter drive unit 35 in this space between the mirror box 14 and the battery chamber 32 achieves the space-efficient arrangement of the mirror drive mechanism 40 with no increase in size of the camera 10. In addition, the side-by-side arrangement of the mirror drive motor 41 of the mirror drive mechanism 40 and the shutter drive unit 35 in the leftward/rightward direction achieves a reduction in thickness of the camera body 11 in the forward/rearward direction, which makes it possible to form the grip of the camera 10 into an easy hand-held grip while ensuring a sufficient depth of the finger hooking recess 33*b*.

In addition, since the height of the mirror drive mechanism 40 is minimized, the internal space of the camera body 11 immediately above the mirror drive mechanism 40 can be effectively utilized as an installation space for the sub-LCD 30 as shown in FIGS. 2 and 4. As described above, the sub-LCD 30 is arranged at a tilt so that the front (the object side) of the sub-LCD 30 is positioned higher than the rear (the user side) of the same in the forward/rearward direction, so that a triangular space S (see FIG. 4) is obtained immediately below the sub-LCD 30. The reduction gear train 42 and the end-face cam gear 43 are partly arranged in a front area of the space S, which contributes to more superior space utilization.

The conversion of rotational driving of the reduction gear train 42 into up-and-down movements of the slider 44 makes the above described arrangement of the components of the mirror drive mechanism 40 possible. The end-face cam gear 43 is provided above the pair of main mirror support shafts 16*x*, which serves as the rotation center of the movable mirror 15, with respect to the upward/downward direction. Unlike the present embodiment of the camera, it is structurally possible to modify the camera 10 such that the vertical positions of the mirror drive mechanism 40 and the shutter charge mechanism 60 be reversed so that the end-face cam gear 43 is provided below the pair of main mirror support shafts 16*x* with respect to the upward/downward direction; however, arranging the end-face cam gear 43 above the pair of main mirror support shafts 16*x* with respect to the upward/downward direction is superior in space utilization than arranging the end-face cam gear 43 below the pair of main mirror support shafts 16*x* with respect to the upward/downward direction. On the premise of the end-face cam gear 43 of the mirror drive mechanism 40 being provided above the pair of main mirror support shafts 16*x*, by providing the mirror press portions 45*g* and 46*c* and the mirror seat boss 16*b*, which are linkage portions between the slider 44 and the movable mirror 15, at radial positions of the pair of main mirror support shafts 16*x* in the close vicinity of one of main mirror support shafts 16*x* as described above, the amount of rotation of the movable mirror 15 per unit of movement of the slider 44 increases to thereby reduce the range of movement of the slider 44, which makes it possible to achieve a reduction in installation space for the slider 44. Additionally, since the pair of main mirror support shafts 16*x* pivot an upper side portion of the main-mirror holding frame 16, the slider 44 access the mirror seat boss 16*b* easily and can be made smaller in the case where the end-face cam gear 43 is arranged above the pair of main mirror support shafts 16x with respect to the upward/downward direction than the case where the end-face cam gear 43 is arranged below the pair of main mirror support shafts 16x with respect to the upward/downward direction.

For instance, in a comparative example in which the end-face cam gear 43' is provided below the pair of main mirror support shafts 16x with respect to the upward/downward direction, the position where the end-face cam gear 43' is allowed to be installed without interfering with the shutter drive unit 35 is in the close vicinity of the pinion 61b of the shutter charge motor 61. The distance from this position to the mirror seat boss 16b is great, thus causing an increase in size of the slider 44' in the upward/downward direction if it is attempted to make the slider 44' linked with the mirror seat boss 16b. Additionally, since the position of the aforementioned charge member in the shutter drive unit 35 is predetermined, and since the position of shutter charge press portion 64b of the shutter charge lever 64 remains unchanged at the position shown in the drawings, the installation position of the slider 44' needs to be shifted forward or leftward to prevent the slider 44' from interfering with the shutter charge mechanism in order to make the slider 44' linked with the mirror seat boss 16b from below, which makes the structure complicated and difficult to design, thus making the structure increase in size. If the movable mirror 15 is provided, on an outer diameter side at a position farther from the pair of main mirror support shafts 16x than the mirror seat boss 16b (e.g., at a position closer to the stopper 16a), with a linkage portion which can be linked with the slider 44', it is possible to reduce the length of the slider 44' in the upward/downward direction; moreover, the installation position of the slider 44' does not need to be shifted either forward or leftward to prevent the slider 44' from interfering with the shutter charge mechanism. However, in such a case, the slider 44' will press a portion of the main-mirror holding frame 16 at a position far from the pair of main mirror support shafts 16x, so that the amount of rotation of the movable mirror 15 per unit of movement of the slider 44' becomes small, which consequently requires a large space for securing the range of movement of the slider 44'. In other words, the thickness of the end-face cam gear 43', which controls upward and downward movements of the slider 44, in the axial direction, becomes great, which causes an increase in height of the entire mirror drive mechanism in the upward/downward direction. By contrast, according to the present embodiment, in which the end-face cam gear 43 is arranged above the pair of main mirror support shafts 16x with respect to the upward/downward direction, small movements of the slider 44, which is small in size, can make the movable mirror 15 operate efficiently.

Focusing attention on the structure of the slider 44, it can be understood that the cam follower 45j, with which the end-face cam 43c is in contact with, is installed between the first guide shaft 47 and the second guide shaft 48, which guide the slider 44 in the upward/downward direction, at a position with respect to the forward/rearward direction (see FIGS. 9, and 11 through 13). This arrangement enables a reduction of the influence of force that makes the slider 44 tilt when the end-face cam 43c presses the cam follower 45j, thus making smooth movement of the slider 44 possible.

As described above, in the first embodiment of the camera 10, the mirror drive mechanism 40 and the shutter charge mechanism 60 are equipped with the motor 41 and the motor 61 that are independent of each other, and the arrangement of the mirror drive mechanism 40 and the shutter charge mechanism 60 is superior in space utilization in each of the leftward/rightward (widthwise) direction, the upward/downward direction and the forward/rearward direction of the camera 10, and accordingly, the camera 10 can be made compact in size with an improvement in performance of the movable mirror 15 and the shutter 20 (specifically, while achieving an increase in speed of photographing operation (an increase in frame speed) due to diversification and control of the capacity being optimized for each of the movable mirror 15 and the shutter 20).

The internal structure of a second embodiment of the camera 10 will be hereinafter discussed with reference to FIGS. 16 through 26. A mirror drive mechanism 140 in the second embodiment of the camera is substantially the same in configuration as the mirror drive mechanism 40 in the first embodiment of the camera, and the components of the mirror drive mechanism 140 which correspond to those of the mirror drive mechanism 40 are designated by the same reference numerals as the two-digit numbers, with "100" added thereto (i.e., designated by three-digit numbers (with alphabetical letters affixed to the end of some of these numbers)). The components of the mirror drive mechanism 140 designated by three-digit numbers (the last two digits of which correspond with those of the components of the mirror drive mechanism 40) are similar in configuration and function to the corresponding components of the mirror drive mechanism 40, and the detailed descriptions of such components of the mirror drive mechanism 140 will be omitted from the following description.

Similar to the above described mirror drive mechanism 40, the mirror drive mechanism 140 transmits the driving force of a mirror drive motor 141 to an end-face cam gear (rotatable cam member) 143 via a reduction gear train 142 to rotate the end-face cam gear 143, this rotation of the end-face cam gear 143 causes the position of a slider 144 (a first slider 145 and a second slider 146) to change in the upward/downward direction, and the movable mirror 15 operates (rotates) by variations in position of the slider 144. Rotation of the mirror drive motor 141 is controlled by a control circuit (motor controller) 155 (see FIG. 26) provided in the camera 10.

Figure 22:
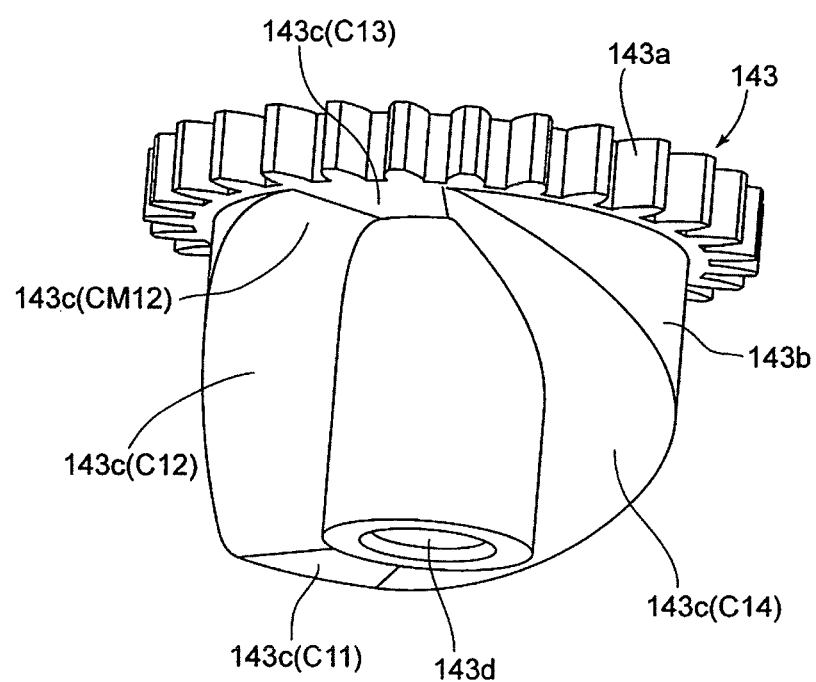
FIG. 22 is a perspective view of an end-face cam gear which constitutes a component of the mirror drive mechanism of the second embodiment of the SLR camera in the mirror-up state, viewed obliquely from below.
Figure 23:
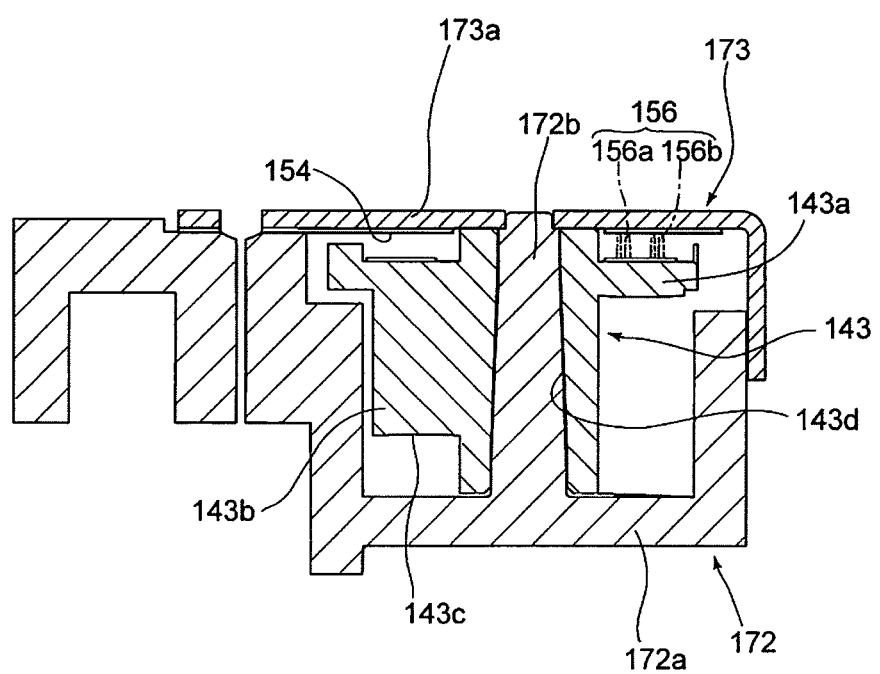
FIG. 23 is a cross sectional view of the end-face cam gear shown FIG. 22 and support parts therefor.

As shown in FIG. 23, a mirror drive gear block casing 172 is provided, on a bottom wall 172a thereof, with a fixed shaft 172b which projects upward, and the end-face cam gear 143 is rotatably fitted on the fixed shaft 172b with the fixed shaft 172b inserted into a shaft hole 143d of the end-face cam gear 143. The mirror drive mechanism 140 is not provided with a biasing member corresponding to the cam-follower shock-absorbing spring 74 of the mirror drive mechanism 40. As shown in FIG. 22, the end-face cam gear 143 is provided with a gear portion 143a which is in mesh with an idle gear 142c of the reduction gear train 142 and a cylindrical cam portion 143b which is formed immediately below the gear portion 143a. An end-face cam 143c which faces downward is formed on the cylindrical cam portion 143b. The end-face cam 143c is provided with a mirror-down holding surface C11 which is positioned at a lower part farthest from the gear portion 143a (i.e., which is great in the amount of projection in the axial direction) and a mirror-up holding surface C13 which is positioned at an upper part close to the gear portion 143a (i.e., which is small in the amount of projection in the axial direction), and the end-face cam 143c is further provided with a spiral-shaped mirror-up cam surface (recessed cam area) C12 and a spiral-shaped mirror-down cam surface (pressing cam area) C14 which are positioned between the mirror-down holding surface C11 and the mirror-up holding surface C13 to connect the mirror-down holding surface C11 and the mirror-up holding surface C13. As can be seen from the developed contour of the end-face cam 143c shown in an upper part of the drawing shown in FIG. 25, each of the mirror-down holding surface C11 and the mirror-up holding surface C13 is a flat surface substantially orthogonal to the rotational shaft of the end-face cam gear 143, while the mirror-up cam surface C12 is a cam surface which is greater in inclination (amount of displacement in the axial direction per unit of rotation angle of the end-face cam gear 143) than the mirror-down cam surface C14. The end-face cam gear 143 is provided, on the portion of the mirror-up cam surface C12 which is connected to the mirror-up holding surface C13, with a gently-inclined connecting surface CM12 which gradually decreases in inclination in a direction from the mirror-up cam surface C12 to the mirror-up holding surface C13.

Figure 18:
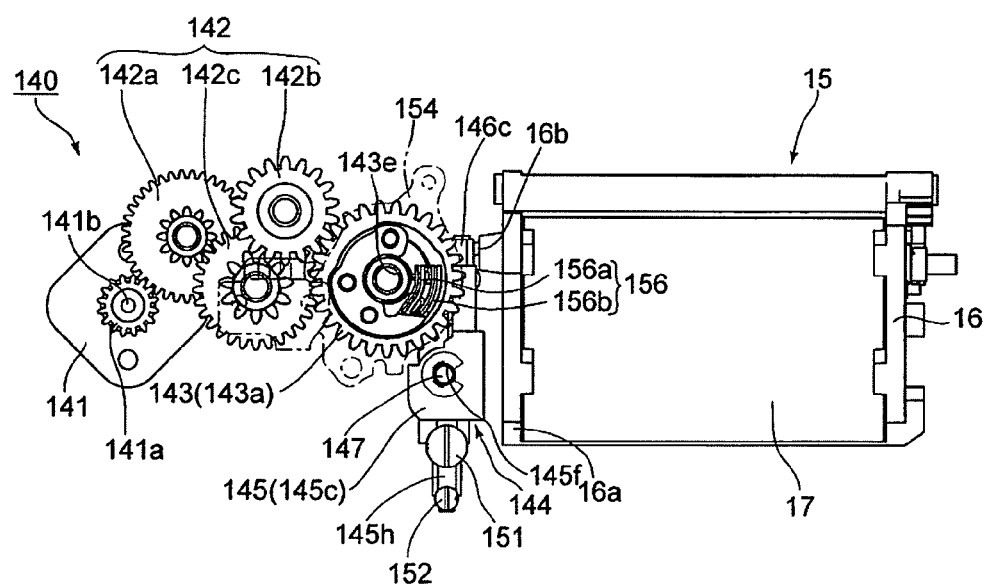
FIG. 18 is a top view of the mirror drive mechanism of the second embodiment of the SLR camera in the mirror-down state.
Figure 19:
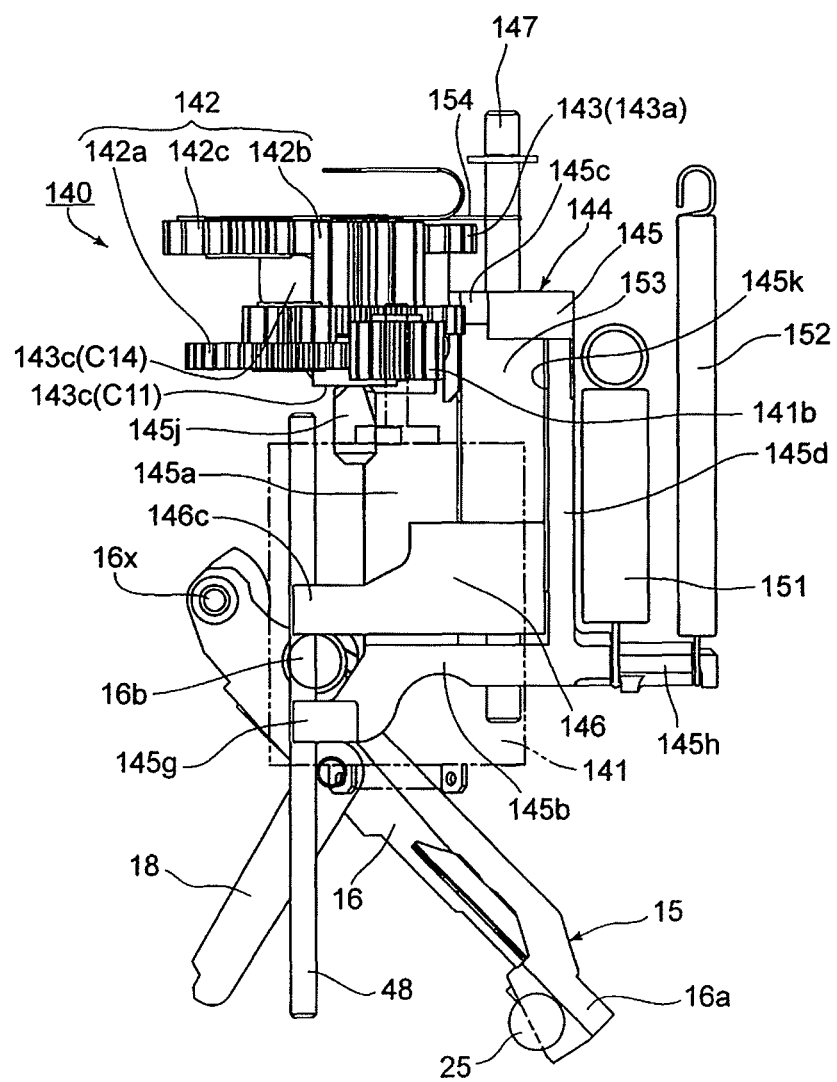
FIG. 19 is a side elevational view of the mirror drive mechanism of the second embodiment of the SLR camera in the mirror-down state.
Figure 20:
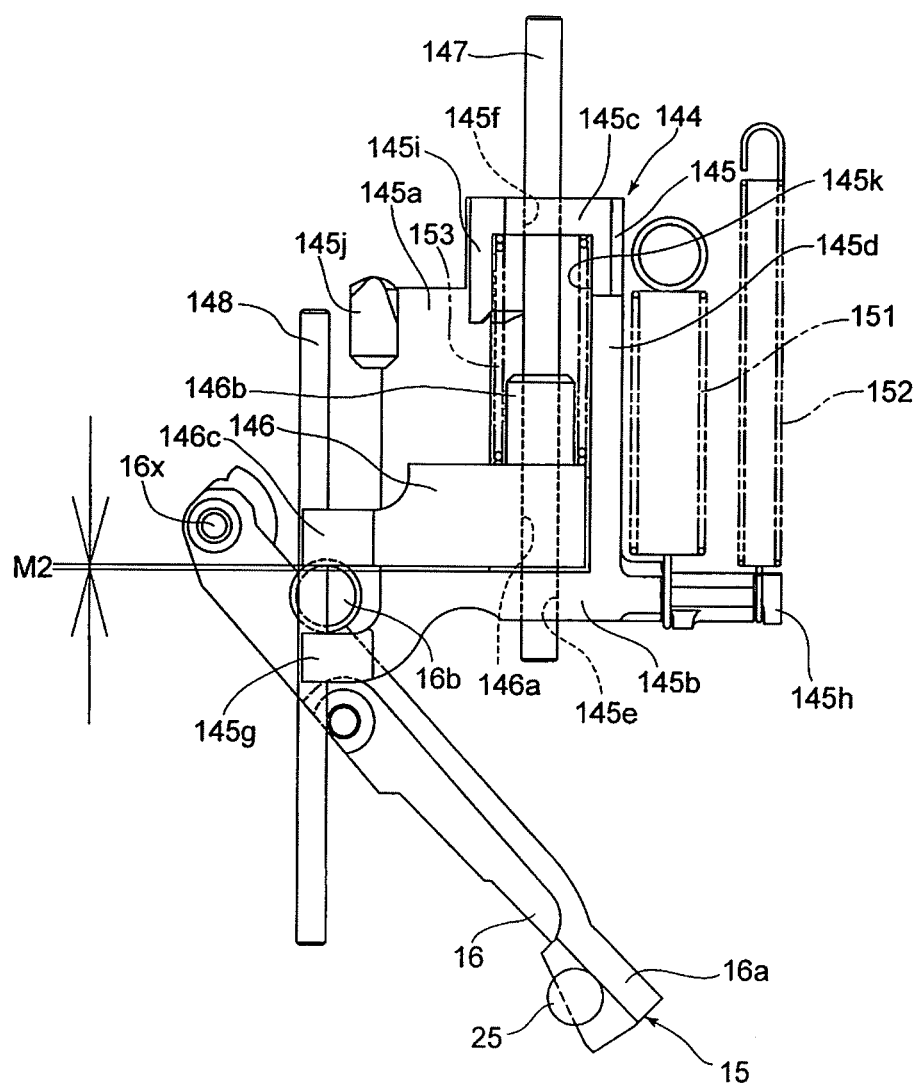
FIG. 20 is a side elevational view of a portion of the mirror drive mechanism of the second embodiment of the SLR camera in the mirror-down state.

As shown in FIGS. 18 and 23, the mirror drive mechanism 140 is provided on top of the end-face cam gear 143 with a contact brush 156 which is fixedly mounted thereto, and a code plate 154 is fixed to a mirror drive gear block cover 173 at a position which faces the contact brush 156. The code plate 154 is electrically connected to the control circuit 155 (see FIG. 26), and the rotational position of the end-face cam gear 143 can be detected from the relative contact position between the contact brush 156 and the code plate 154.

Figure 24:
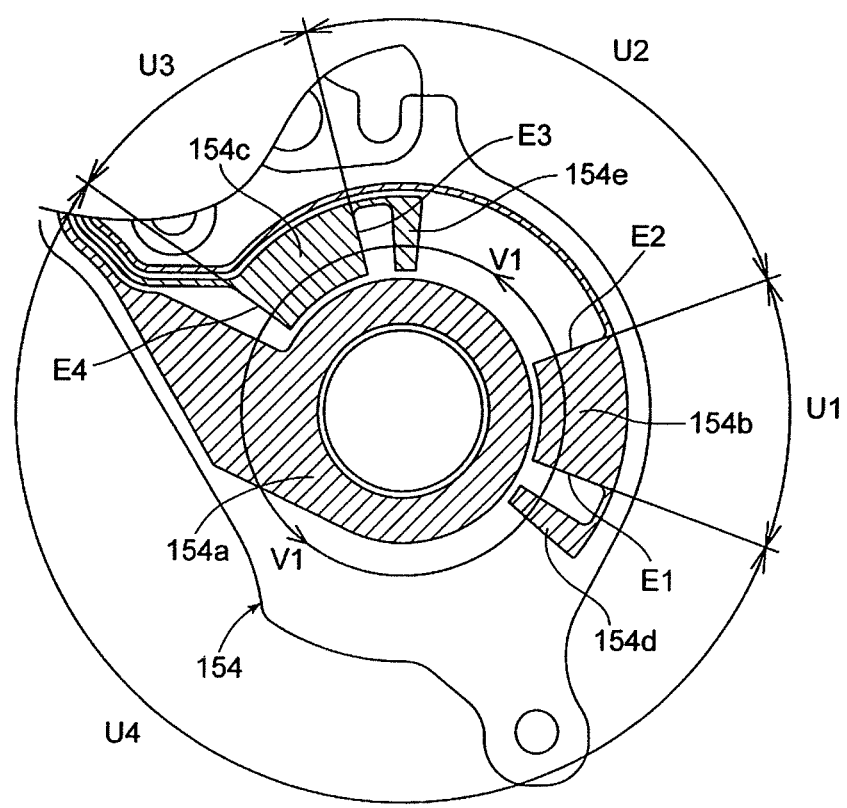
FIG. 24 is a bottom view of a code plate for detecting the position of the end-face cam gear shown in FIG. 22 in the rotation direction thereof.

FIG. 24 shows the structure of the code plate 154 in detail. The code plate 154 is provided with a ground contact 154a, a mirror-down contact 154b and a mirror-up contact 154c. The code plate 154 is further provided with a front contact 154d and a front contact 154e which are in electrical conduction with the mirror-down contact 154b and the mirror-up contact 154c, respectively. In FIG. 24, the ground contact 154a, the mirror-down contact 154b, the mirror-up contact 154c, the front contact 154d and the front contact 154e are hatched to be easily visually identified. The ground contact 154a has a continuous ring shape formed circumferentially about the axis of the rotational shaft of the end-face cam gear 143, while the mirror-down contact 154b, the mirror-up contact 154c, the front contact 154d and the front contact 154e are arranged around the ground contact 154a at different circumferential positions. The contact brush 156 is provided with a radially inner side terminal 156a and a radially outer side terminal 156b. The radially inner side terminal 156a is in contact with the ground contact 154a at all times, while the radially outer side terminal 156b selectively contacts the mirror-down contact 154b, the mirror-up contact 154c, the front contact 154d and the front contact 154e in accordance with the rotational position of the end-face cam gear 143. An ON-signal of a mirror-down switch (see FIG. 25) is input to the control circuit 155 in a state where the radially outer side terminal 156b of the contact brush 156 is in contact with the mirror-down contact 154b, and an ON-signal of a mirror-up switch (see FIG. 25) is input to the control circuit 155 in a state where the radially outer side terminal 156b of the contact brush 156 is in contact with the mirror-up contact 154c.

The mirror drive motor 141 is a DC motor which rotates a rotational output shaft 141a thereof forward and reverse. The end-face cam gear 143 is a single-rotation cam gear which makes the movable mirror 15 perform one reciprocating motion while rotating by a single rotation (360 degrees) by the forward driving of the mirror drive motor 141. Arrows V1 shown in FIG. 24 designate the rotation direction of the end-face cam gear 143 when the mirror drive motor 141 rotates forward. The mirror-down contact 154b of the code plate 154 is provided with an edge E1 and an edge E2 which are positioned at the front end and the rear end of the mirror-down contact 154b in the rotational traveling direction (V1) of the end-face cam gear 143, respectively. Likewise, the mirror-up contact 154c of the code plate 154 is provided with an edge E3 and an edge E4 which are positioned at the front end and the rear end of the mirror-up contact 154c in the rotational traveling direction (V1) of the end-face cam gear 143, respectively. Accordingly, the mirror-down contact 154b is formed in the area on the code plate 154 which ranges from the edge E1 to the edge E2 in the rotation direction of the end-face cam gear 143, while the mirror-up contact 154c is formed in the area on the code plate 154 which ranges from the edge E3 to the edge E4 in the rotation direction of the end-face cam gear 143. The range from the edge E1 to the edge E2 in the rotation direction of the end-face cam gear 143 (i.e., the range of formation of the mirror-down contact 154b) will be hereinafter referred to as the mirror-down range U1, the range from the edge E2 to the edge E3 in the rotation direction of the end-face cam gear 143 will be hereinafter referred to as the mirror-up transitional range U2, the range from the edge E3 to the edge E4 in the rotation direction of the end-face cam gear 143 will be hereinafter referred to as the mirror-up range U3, and the range from the edge E4 to the edge E1 in the rotation direction of the end-face cam gear 143 will be hereinafter referred to as the mirror-down transitional range U4.

The first slider 145 is biased upward by a first mirror-up spring (biaser) 151 and a second mirror-up spring (biaser) 152. The upper end of a cam follower 145j formed on the first slider 145 is at a position facing against the end-face cam 143c of the end-face cam gear 143, and the biasing force of the first mirror-up spring 151 and the second mirror-up spring 152 acts on the first slider 145 in a direction to bring the cam follower 145j into contact with the end-face cam 143c. The portion of the cam follower 145j which abuts against the end-face cam 143c is shaped so that a component of pressure force in the upward/downward direction (in a direction parallel to the axes of the first guide shaft 147 and the second guide shaft 148) occurs between the mirror-up cam surface C12 and the mirror-down cam surface C14 in accordance with rotation of the end-face cam gear 143. Although variations in position of the cam follower 145j relative to the end-face cam 143c when the end-face cam gear 143 is rotated are shown in an upper part of the drawing shown in FIG. 25, the cam follower 145j is schematically shown by a circular-shaped two-dot chain line in FIG. 25.

Operations of the mirror drive mechanism 140 will be discussed hereinafter. The basic operation of the mirror drive mechanism 140 is the same as that of the above described mirror drive mechanism 40, so that the description of operations of the mirror drive mechanism 140 which are identical to those of the mirror drive mechanism 40 will be partly omitted from the following description. The rotational driving direction of the mirror drive motor 141 in the rotation direction V1 shown in FIG. 24 and the rotational driving direction of the mirror drive motor 141 in the direction reverse to the rotation direction V1 shown in FIG. 24 will be referred to as the forward driving direction and the reverse driving direction of the mirror drive motor 141, respectively.

When the mirror-down holding surface C11 of the end-face cam 143c of the end-face cam gear 143 faces against the cam follower 145j of the first slider 145 in the mirror-down state shown in FIGS. 16 through 20, the point of contact of the radially inner side terminal 156a of the contact brush 156 with the code plate 154 and the point of contact of the radially outer side terminal 156b of the contact brush 156 with the code plate 154 are in the mirror-down range U1. In the mirror-down range U1, the radially inner side terminal 156a of the contact brush 156 is in contact with the ground contact 154a and the radially outer side terminal 156b of the contact brush 156 is in contact with the mirror-down contact 154b, which turns ON the mirror-down switch (see FIG. 25). In the mirror-down state shown in FIGS. 16 through 20, an enlarged clearance M2 defined by the difference between the diameter of the mirror seat boss 16b and an enlarged distance between the mirror press portion 145g of the first slider 45 and the mirror press portion 146c of the second slider 146 exists (the first slider 145 is in a state of being downwardly overcharged with respect to the second slider 146).

Upon inputting a signal for an operation such as a shutter release or a live view operation that is accompanied by a mirror-up operation of the movable mirror 15 in the mirror-down state, the control circuit 155 drives the mirror drive motor 141 forward (see T1 shown in FIG. 25) to rotate the end-face cam gear 143 (in the rotation direction V1 shown in FIG. 24). The mirror-down holding surface C11 has a predetermined width in the rotation direction of the end-face cam gear 143, and the mirror drive motor 141 is driven to rotate forward at a constant speed (power) during the time the mirror-down holding surface C11 is in contact with the cam follower 145j (during the time the point of contact of the radially inner side terminal 156a with the code plate 154 and the point of contact of the radially outer side terminal 156b with the code plate 154 are in the mirror-down range U1 shown in FIG. 24).

Figure 25:
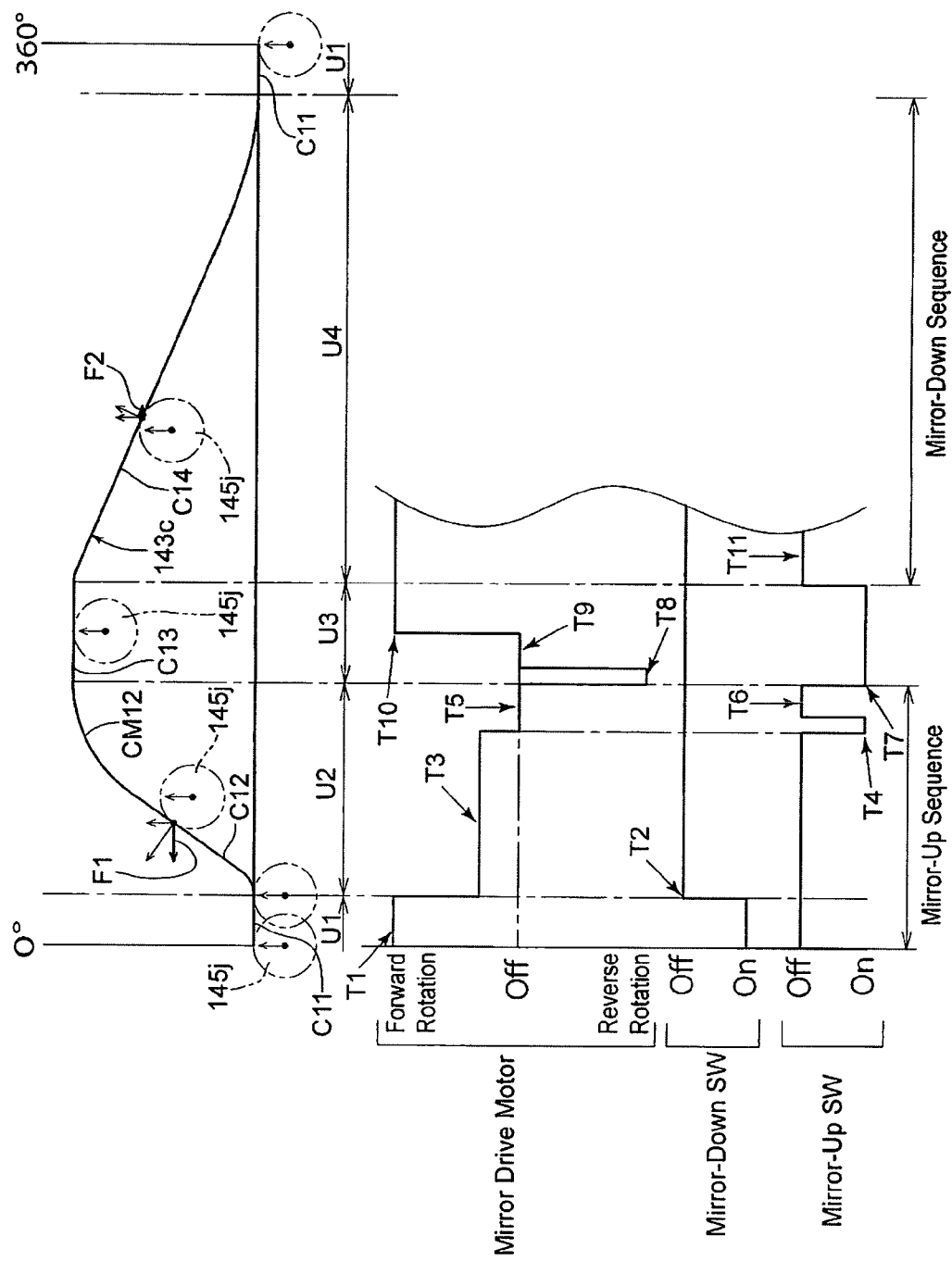
FIG. 25 is a timing chart showing the relationship between the developed contour of the end-face cam gear shown in FIG. 22, detection of the position of the end-face cam gear shown in FIG. 22 in the rotation direction thereof, and motor drive control.
Figure 26:
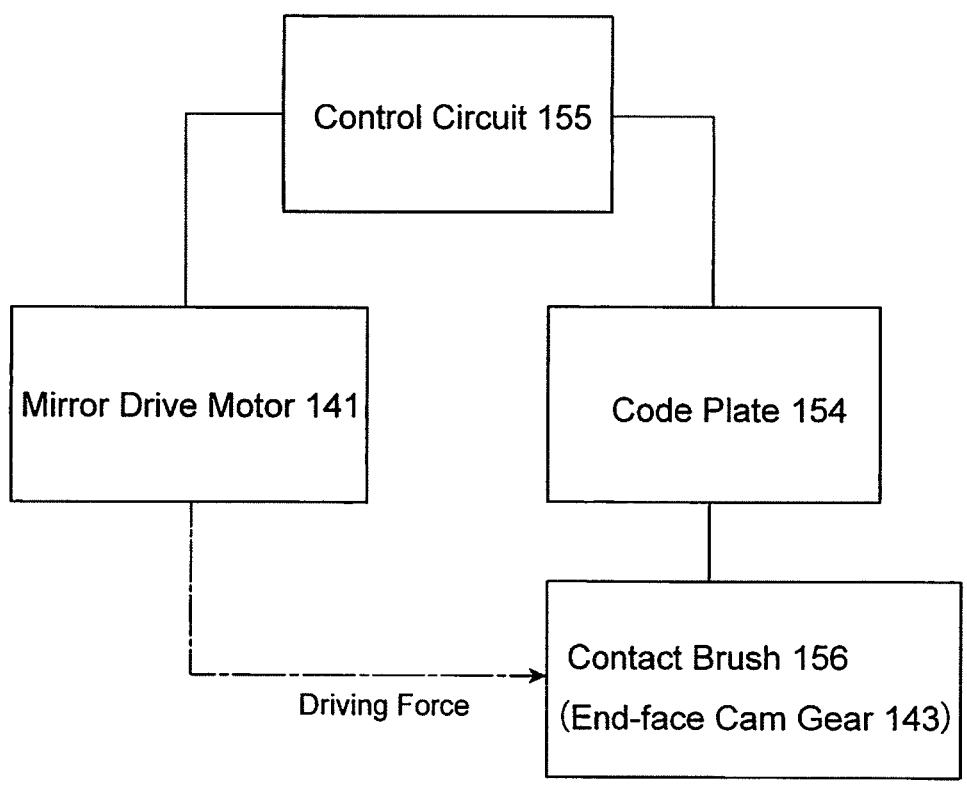
FIG. 26 is a block diagram of electrical components of the mirror drive mechanism of the second embodiment of the SLR camera, showing the connection relationship between the electrical components.

Upon the point of contact of the radially outer side terminal 156b of the contact brush 156 with the code plate 154 crossing over the edge E2 and entering the mirror-up transitional range U2, the radially outer side terminal 156b is disengaged from the mirror-down contact 154b to thereby turn OFF the mirror-down switch (T2 shown in FIG. 25). Upon the mirror-down switch being turned OFF, the control circuit 155 rotates the mirror drive motor 141 at a reduced speed (T3 shown in FIG. 25). As can be seen from FIG. 25, at this stage the mirror-down holding surface C11 of the end-face cam 143c retracts from a position facing against the cam follower 145j, and the mirror-up cam surface C12 of the of the end-face cam 143c in turn faces against the cam follower 145j. Thereupon, the slider (driven member) 144 is allowed to move upward, and hence, moves upward from the mirror-down holding position due to the biasing force of the first mirror-up spring 151 and the second mirror-up spring 152. This causes a mirror press portion 145g of the first slider 145 of the slider 144, which moves upward, to lift the mirror seat boss 16b, thus causing the movable mirror 15 to rotate toward the mirror-up position. When the slider 144 moves upward, the overcharge of the first slider 145 with respect to the second slider 146 is released, so that the clearance on the slider 144 side with respect to the mirror seat boss 16b changes from the enlarged clearance M2 (see FIG. 20) in the mirror-down state to the minimum clearance M1 (see FIG. 21). Since the minimum clearance M1 is secured, no frictional resistance occurs between the mirror seat boss 16b and each of the first slider 145 and the second slider 146, even though the mirror seat boss 16b is positioned between the first slider 145 and the second slider 146, which enables smooth mirror-up operation of the movable mirror 15. In addition, an improvement in durability of the mirror drive mechanism 140 is achieved.

The load on the end-face cam 143c varies upon the mirror drive mechanism 140 commencing a mirror-up operation, which allows the cam follower 145j to move upward in accordance with the biasing force of the first mirror-up spring 151 and the second mirror-up spring 152 from the mirror-down state, in which the end-face cam 143c depresses the cam follower 145j against the biasing force of the first mirror-up spring 151 and the second mirror-up spring 152. Specifically, pushing the mirror-up cam surface C12 upward by the cam follower 145j, which receives the biasing force of the first mirror-up spring 151 and the second mirror-up spring 152, causes a torque (component force) in a rotation assisting direction shown by an arrow F1 shown in FIG. 25 to act on the end-face cam gear 143. However, acceleration of the end-face cam gear 143 which may be caused by the assisting torque is reduced (regulated) by driving the mirror drive motor 141 forward at a reduced speed (T3 shown in FIG. 25) during the mirror-up operation of the movable mirror 15, which makes it possible to make the slider 144 and the movable mirror 15 operate precisely, according to an assumed cam curve.

When the end-face cam gear 143 rotates while controlling the position of the slider 144 via the mirror-up cam surface C12 to thereby cause the radially outer side terminal 156b of the contact brush 156 to come into contact with the front contact 154e while traveling in the mirror-up transitional range U2, the mirror-up switch is turned ON for a short period of time (T4 shown in FIG. 25). Upon inputting this ON-signal, the control circuit 155 stops the forward driving (specifically the forward driving at a reduced speed) of the mirror drive motor 141 (T5 shown in FIG. 25). At this moment, both terminals of the mirror drive motor 141 are short-circuited to apply a short-brake to the mirror drive motor 141. This causes the end-face cam gear 143 to be reduced in rotational speed while rotating by inertia. As can be seen from FIG. 25, at the stage at which the mirror drive motor 141 has stopped rotating forward, the cam follower 145j is in contact with the gently-inclined connecting surface CM12, which is gentle in inclination, of the mirror-up cam surface C12, which makes it possible to bring the cam follower 145j into contact with the subsequent mirror-up allowing surface C13 smoothly. With this structure, shock of the movable mirror 15 when the movable mirror 15 moves to the mirror-up position can be suppressed without requiring the cam-follower shock-absorbing spring 74 of the mirror drive mechanism 40 of the first embodiment of the camera 10.

Continuing rotation of the end-face cam gear 143 by inertia after the mirror drive motor 141 stops rotating forward (T5 shown in FIG. 25) causes the radially outer side terminal 156b of the contact brush 156 to pass through the front contact 154e to thereby turn OFF the mirror-up switch (T6 shown in FIG. 25). Further rotation of the end-face cam gear 143 causes the point of contact of the radially outer side terminal 156b with the code plate 154 to cross the edge E3 and enter the mirror-up range U3, and thereupon the mirror-up switch is again turned ON (T7 shown in FIG. 25). Consequently, the control circuit 155 applies a reverse-rotation braking to the mirror drive motor 141 by rotating the mirror drive motor 141 in reverse for a short period of time (T8 shown in FIG. 25), and thereupon stops the mirror drive motor 141 (T9 shown in FIG. 25). In this state, the end-face cam gear 143 is held at a position where the mirror-up allowing surface C13 faces against the cam follower 145j. When the cam follower 145j is in contact with the mirror-up allowing surface C13, the slider 144 is in a mirror-up allowing position shown in FIG. 21, and the movable mirror 15 lifted by the mirror press portion 145g of the slider 144 has reached the mirror-up position. In this mirror-up state, the aforementioned minimum clearance M1 exists between the mirror press portion 146c and the mirror seat boss 16b, so that the slider 144 exerts no influence on the movable mirror 15 in the mirror-up position. In the mirror-up state, an exposure operation or a live view operation can be carried out by actuating the shutter 20.

In the above described mirror-up operation, upon the point of contact of the cam follower 145j with the end-face cam 143c moving from the mirror-down holding surface C11 to the mirror-up cam surface C12, acceleration of the end-face cam gear 143 is reduced by driving the mirror drive motor 141 forward at a reduced speed (T3 shown in FIG. 25). In addition, the end-face cam gear 143 is stopped by applying a short-brake (T5 shown in FIG. 25) or a reverse-rotation braking (T8 shown in FIG. 25) to the mirror drive motor 141 when the point of contact of the cam follower 145*j* with the end-face cam 143*c* moves from the mirror-up cam surface C12 to the mirror-up holding surface C13. Unlike this control of the present embodiment, if the mirror drive motor 141 were not to be driven forward at a reduced speed (i.e., if the mirror drive motor 141 were to be driven forward at a non-reduced speed), there is a possibility of the end-face cam gear 143 rotating at a rotational speed faster than assumed due to an assisting torque (F1 shown in FIG. 25) from the cam follower 145*j* during the mirror-up operation of the movable mirror 15, which may increase the magnitude of an impact on the slider 144 and the movable mirror 15 occurring upon completion of the mirror-up operation of the movable mirror 15. It is possible to select an option to reduce the acceleration of the end-face cam gear 143 by making the timing of application of a short brake earlier; however, this makes the rotational speed of the end-face cam gear 143 become excessively slow, thus exerting an adverse influence on the operating performance of the movable mirror 15 (photographing frame speed). By contrast, by making the movable mirror 15 perform a mirror-up operation by a forward driving of the mirror drive motor 141 at a reduced speed, the rotational speed of the end-face cam gear 143 does not become either excessively slow or fast, which makes it possible to achieve a high-precision mirror-up operation at an optimum speed.

The switching of the driving speed of the mirror drive motor 141 from T1 to T3 shown in FIG. 25 can be performed by a method of changing the duty ratio of a pulse waveform under PWM (Pulse Width Modulation) control or a method of changing the motor drive voltage. The duty ratio of the mirror drive motor 141 under PWM control can be changed by making the energizing period and the non-energizing period in each cycle period different in duration from each other. Alternatively, in each cycle period, both terminals of the mirror drive motor 141 are temporarily short-circuited to create an OFF-state similar to the non-energization state, and the duty ratio can be changed by setting the duration of the short-circuit. The difference in speed given to the driving speed of the mirror drive motor 141 between T1 and T3 shown in FIG. 25 depends on the output of the mirror drive motor 141, the load variation acting on the end-face cam gear 143, etc. However, taking PWM control as an example, the speed of the mirror drive motor 141 can be appropriately reduced by setting the duty ratio smaller than 50 percent when the driving speed is reduced at T3, shown in FIG. 25. For instance, in the case of setting the duty ratio by making the energizing period and the non-energizing period in each cycle period different in duration from each other, it is advisable that the duration of the non-energizing period be made greater than 100% of the duration of the energizing period (that the duration of a non-energizing period be made greater than the duration of an energizing period in each cycle period).

Subsequently, in response to a transition signal for transferring from the mirror-up state to the mirror-down state, the control circuit 155 drives the mirror drive motor 141 forward (T10 shown in FIG. 25) to rotate the end-face cam gear 143. The rotation direction of the end-face cam gear 143 at this time is a direction to change the area of the end-face cam 143*c* which faces against the cam follower 145*j* from the mirror-up holding surface C13 to the mirror-down cam surface C14. Upon the point of contact of the radially outer side terminal 156*b* of the contact brush 156 with the code plate 154 crossing over the edge E4 and entering the mirror-down transitional range U4, the radially outer side terminal 156*b* is disengaged from the mirror-down contact 154*b* to turn OFF the mirror-down switch (T11 shown in FIG. 25).

The mirror-down cam surface C14 is an inclined surface, the downward projecting amount of which increases in a direction to approach the mirror-down holding surface C11 away from the mirror-up allowing surface C13, and accordingly, the rotation of the end-face cam gear 143 by a forward rotation of the mirror drive motor 141 with the mirror-down cam surface C14 facing against the cam follower 145*j* causes the mirror-down cam surface C14 to press the cam follower 145*j* gradually downward, which causes the slider 144 to move downward from the mirror-up allowing position against the biasing force of the first mirror-up spring 151 and the second mirror-up spring 152. This downward movement of the slider 144 causes the mirror press portion 146*c* of the second slider 146 to press the mirror seat boss 16*b* to rotate the movable mirror 15 from the mirror-up position toward the mirror-down position.

Although an illustration of operations of the mirror drive motor 141 on and after the mirror-down operation is omitted from the timing chart shown in FIG. 25, the mirror-down switch is turned ON for a short period of time when the radially outer side terminal 156*b* of the contact brush 156 comes into contact with the front contact 154*d* while traveling in the mirror-up transitional range U4 by a rotation of the end-face cam gear 143. Upon inputting this ON-signal, the control circuit 155 stops the forward driving of the mirror drive motor 141 (both terminals of the mirror drive motor 141 are short-circuited to apply a short-brake to the mirror drive motor 141). The end-face cam gear 143 continues to rotate by inertia, and this rotation of the end-face cam gear 143 causes the radially outer side terminal 156*b* to pass through the front contact 154*d* to turn OFF the mirror-down switch. Subsequently, further rotation of the end-face cam gear 143 causes the point of contact of the radially outer side terminal 156*b* of the contact brush 156 with the code plate 154 to cross the edge E1 and enter the mirror-down range U1, and thereupon the mirror-down switch is again turned ON. Consequently, the control circuit 155 applies a reverse-rotation braking to the mirror drive motor 141 by rotating the mirror drive motor 141 in reverse for a short period of time to stop the mirror drive motor 141. In this state, the mirror-down holding surface C11 is in contact with the cam follower 145*j*, while the slider 144 has reached the mirror-down holding position, so that the movable mirror 15 is held in the mirror-down position.

Contrary to when the movable mirror 15 rotates to the mirror-up position, when the movable mirror 15 rotates to the mirror-down position, the mirror drive mechanism 140 operates so that the mirror-down cam surface C14 presses the cam follower 145*j* against the load (shown by an arrow F2 shown in FIG. 25) in the direction opposite to the rotation assisting direction of the end-face cam gear 143, and accordingly, the slider 144 exerts no rotation assisting torque on the end-face cam gear 143. Accordingly, in the mirror-down operation, the control circuit 155 drives the mirror drive motor 141 forward at a normal speed with no speed reduction control like T3 shown in FIG. 25 (T10 shown in FIG. 25). In other words, the control circuit 155 controls the operation of the mirror drive motor 141 so that the forward driving speed of the mirror drive motor 141 during the mirror-up operation is slower than that during the mirror-down operation.

As can be understood from the foregoing, in the mirror drive mechanism 140, the optimization of the rotational speed of the end-face cam gear 143 is achieved by changing the forward driving speed of the mirror drive motor 141 in accordance with the status of use of the end-face cam 143*c* of the end-face cam gear 143 (in accordance with the position of the end-face cam gear 143 in the rotation direction thereof). In particular, compared with the time the end-face cam 143c of the end-face cam gear 143 presses the cam follower 145j against the load, the end-face cam gear 143 can be driven to rotate at an appropriate speed without the end-face cam gear 143 accelerating due to an assisting torque or an excessive reduction in rotational speed of the end-face cam gear 143 occurring due to a brake being applied to the mirror drive motor 141, by driving the mirror drive motor 141 forward at a reduced speed when an assisting torque acts on the end-face cam gear 143 from the cam follower 145j.

Although the above illustrated embodiment is applied to SLR camera equipped with the mirror drive mechanism 140 to which the present invention has been applied, a control apparatus for a cam drive mechanism and a control method for a cam drive mechanism according to the present invention are each applicable to any other drive mechanism so long as such a drive mechanism has a basic structure in which the driving force of a motor is transmitted via a rotatable cam member. In the case of SLR cameras, an SLR camera provided with a rotatable cam member in not only a mirror drive mechanism but also in a shutter charge mechanism is known in the art (disclosed in, e.g., Japanese Unexamined Patent Publication No. 2010-266618), and the present invention can also be applied to such a shutter charge mechanism. The present invention can of course be applied to a cam-operated drive mechanism of an apparatus other than an SLR camera.

Additionally, although the end-face cam gear 143 is used as a rotatable cam member in the mirror drive mechanism 140, such an end-face cam gear can be replaced by a peripheral cam including a cam surface formed on a peripheral surface thereof which surrounds the axis of rotation of the cam. As an example, a peripheral cam is used in each of the mirror drive mechanism and the shutter charge mechanism of the SLR camera in the above mentioned Japanese Unexamined Patent Publication No. 2010-266618; the present invention is applicable to the drive control for such a peripheral cam.

Additionally, although the mirror drive motor 141 provided in the mirror drive mechanism 140 is a reversible motor, the present invention is also applicable in the case where a one-way motor is used instead. In this case, the above describe control for the mirror drive motor 141 is effective if the above described reverse-rotation braking control shown by T8 shown in FIG. 25 is omitted from the sequence of operations for driving the mirror drive motor 141 shown in FIG. 25.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
    a movable mirror which is pivoted about a mirror up-and-down pivot orthogonal to an optical axis of an imaging optical system of said camera to be rotatable between an advanced position, in which said movable mirror is positioned in an optical path of said imaging optical system and is inclined at an angle to reflect incident light emanated from an object toward a viewfinder optical system of said camera, and a retracted position, in which said movable mirror is retracted upward from said optical path to allow the object-emanated light to travel toward a shutter which is installed in a rearward position with respect to said optical path; and
    a mirror drive mechanism for rotating said movable mirror,
    wherein said mirror drive mechanism comprises:
    a slider which is supported on a side of said movable mirror to be linearly movable in a vertical direction that corresponds to an up-and-down rotation of said movable mirror, which rotates said movable mirror to said retracted position and said advanced position by moving upward and downward, respectively, said slider including a cam follower;
    an end-face cam member which is positioned above said mirror up-and-down pivot with respect to said vertical direction to be rotatable about a rotational shaft extending in said vertical direction, wherein said end-face cam member includes an end-face cam with which said cam follower is in contact, and said end-face cam member changes a position of said slider in said vertical direction via said end-face cam and said cam follower by rotating; and
    an end-face cam driver which rotates said end-face cam member.

2. The camera according to claim 1, wherein said end-face cam driver comprises:
    a mirror drive motor having a rotational output shaft; and
    a mirror-drive gear train which transmits a driving force of said rotational output shaft to said end-face cam member,
    wherein said mirror drive motor is provided at a position away from said slider, in a camera widthwise direction along said mirror up-and-down pivot, with said rotational output shaft extending upward, and
    wherein said mirror-drive gear train includes a plurality of gears, each of which is rotatably supported by a rotational shaft extending in said vertical direction, said mirror-drive gear train being arranged in a space, defined in said camera widthwise direction, between said mirror drive motor and said slider.

3. The camera according to claim 2, further comprising a shutter drive mechanism which is installed in said space.

4. The camera according to claim 3, further comprising a shutter charge mechanism which makes said shutter drive mechanism perform a shutter charge operation,
    wherein said shutter charge mechanism comprises:
    a charge lever which is pivoted about a charge-lever pivot which is parallel to said mirror up-and-down pivot and makes said shutter drive mechanism perform said shutter charge operation by swinging about said charge-lever pivot;
    a peripheral-cam-integrated member which is rotatably supported by a rotational shaft parallel to said mirror up-and-down pivot and makes said shutter charge lever swing in accordance with rotation of said peripheral-cam-integrated member;
    a shutter charge motor having a rotational output shaft parallel to said mirror up-and-down pivot; and
    a shutter-charge gear train which is configured of a plurality of gears, each rotatable about a rotational shaft parallel to said mirror up-and-down pivot and transmits a driving force of said rotational output shaft of said shutter charge motor to said peripheral-cam-integrated member,
    wherein said shutter charge lever, said peripheral-cam-integrated member and said shutter-charge gear train are supported below said slider, and
    wherein said shutter charge motor is supported below said shutter drive mechanism.

5. The camera according to claim 4, wherein said mirror drive mechanism, said shutter drive mechanism and said shutter charge mechanism are arranged between a mirror box, which supports said movable mirror therein, and a battery chamber which accommodates a battery.

6. The camera according to claim 5, wherein a camera body of said camera comprises:
   a front bulging portion which bulges forward from a front side of said battery chamber;
   a finger hooking recess which is formed between said front bulging portion and said mirror box; and
   a hand-held grip, a contour of which includes contours of said front bulging portion and said finger hooking recess,
   wherein said mirror drive motor is positioned behind said finger hooking recess.

7. The camera according to claim 2, further comprising an information display which is provided on top of said camera at an inclined position so that a front side of said information display is positioned higher than a rear side of said information display, with respect to a forward/rearward direction parallel to said optical axis,
   wherein said mirror-drive gear train and said end-face cam member are at least partly arranged in a space formed below said front of said information display.

8. The camera according to claim 1, wherein said movable mirror is fixedly mounted to a movable-mirror holding member, and
   wherein said slider comprises:
   a first slider which includes a first contact portion which contacts a pressed portion of said movable mirror holding member from below, wherein said first slider presses said pressed portion at said first contact portion to thereby rotate said movable mirror to said retracted position when moving upward;
   a second slider, which is movable relative to said first slider in said vertical direction, which includes a second contact portion which contacts said pressed portion of said movable mirror holding member from above, and wherein said second slider presses said pressed portion at said second contact portion to thereby rotate said movable mirror to said advanced position when moving downward; and
   a resilient connecting member which biases said first slider relative to said second slider in a direction to reduce a distance between said first contact portion and said second contact portion.

9. The camera according to claim 8, wherein said cam follower is provided on said first slider,
   wherein said camera further comprises a slider biaser which biases said first slider upward to make said cam follower come into contact with said end-face cam, and
   wherein said resilient connecting member biases said second slider downward toward said first slider with a biasing force greater in biasing force than said slider biaser.

10. The camera according to claim 8, wherein said first slider and said second slider comprise a clearance limit portion which limits a minimum clearance in said vertical direction between said first contact portion and said second contact portion, and
    wherein a size of said minimum clearance, which is defined by said clearance limit portion, is determined to allow said pressed portion of said movable-mirror holding member to be held between said first contact portion and said second contact portion with a predetermined clearance therebetween.

* * * * *